(12) United States Patent
Kubota et al.

(10) Patent No.: US 8,908,176 B2
(45) Date of Patent: Dec. 9, 2014

(54) APPARATUS AND METHOD FOR OBTAINING SPECTRAL CHARACTERISTICS

(71) Applicants: Yoichi Kubota, Tokyo (JP); Naoko Shigemori, Tokyo (JP); Naohiro Kamijo, Kanagawa (JP); Kohei Shimbo, Kanagawa (JP); Manabu Seo, Kanagawa (JP)

(72) Inventors: Yoichi Kubota, Tokyo (JP); Toshihiro Shigemori, Kanagawa (JP); Naohiro Kamijo, Kanagawa (JP); Kohei Shimbo, Kanagawa (JP); Manabu Seo, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 118 days.

(21) Appl. No.: 13/741,513

(22) Filed: Jan. 15, 2013

(65) Prior Publication Data
US 2013/0182256 A1 Jul. 18, 2013

(30) Foreign Application Priority Data
Jan. 17, 2012 (JP) .................................. 2012-007293

(51) Int. Cl.
| | |
|---|---|
| *G01J 3/28* | (2006.01) |
| *G01J 3/46* | (2006.01) |
| *H03F 1/26* | (2006.01) |
| *H04B 15/00* | (2006.01) |
| *G01J 3/42* | (2006.01) |
| *G01J 3/50* | (2006.01) |
| *G01J 3/02* | (2006.01) |

(52) U.S. Cl.
CPC .. *G01J 3/42* (2013.01); *G01J 3/463* (2013.01); *G01J 3/501* (2013.01); *G01J 3/027* (2013.01); *G01J 2003/466* (2013.01)
USPC ........................... 356/326; 356/402; 702/196

(58) Field of Classification Search
CPC ............. G01J 3/42; G01J 3/463; G01J 3/027; G01J 3/501; G01J 2003/466
USPC ............. 356/326–328, 402; 702/104, 85, 196
See application file for complete search history.

(56) References Cited

U.S. PATENT DOCUMENTS

| | | | |
|---|---|---|---|
| 2002/0165684 A1* | 11/2002 | Olson | ............................ 702/85 |
| 2011/0063615 A1 | 3/2011 | Shimbo et al. | |

(Continued)

FOREIGN PATENT DOCUMENTS

| | | |
|---|---|---|
| EP | 1344193 B1 | 7/2007 |
| JP | 2009-219006 | 9/2009 |
| JP | 2012-013437 | 1/2012 |

OTHER PUBLICATIONS

Extended European Search Report dated May 7, 2013.

(Continued)

*Primary Examiner* — Kara E Geisel
*Assistant Examiner* — Dominic J Bologna
(74) *Attorney, Agent, or Firm* — IPUSA, PLLC

(57) ABSTRACT

A spectral characteristic obtaining apparatus includes a detection unit detecting light quantities in plural wavelength bands from a measurement target, a storage unit storing pre-obtained spectral characteristics of the measurement target, a calculation unit calculating a primary transformation matrix from the light quantities and the pre-obtained spectral characteristics of at least one reference sample and a secondary transformation matrix from one of the pre-obtained spectral characteristics corresponding to a primary wavelength band and another one of the pre-obtained spectral characteristics corresponding to a secondary wavelength band, an estimation unit estimating the spectral characteristics of the measurement target by performing a primary estimation on the light quantities in the plural wavelength bands by using the primary transformation matrix, performing a secondary estimation on a result of the primary estimation by using the secondary transformation matrix, and compositing a result of the secondary estimation with the result of the primary estimation.

6 Claims, 22 Drawing Sheets

(56) References Cited

U.S. PATENT DOCUMENTS

| | | | |
|---|---|---|---|
| 2011/0106472 A1 | 5/2011 | Seo et al. | |
| 2011/0222056 A1* | 9/2011 | Seo et al. | 356/303 |
| 2011/0299104 A1 | 12/2011 | Seo et al. | |
| 2011/0317149 A1* | 12/2011 | Shimbo et al. | 356/72 |
| 2012/0010842 A1* | 1/2012 | Mikhailov et al. | 702/104 |

OTHER PUBLICATIONS

U.S. Appl. No. 13/559,982, filed Jul. 27, 2012, Shimbo et al.
U.S. Appl. No. 13/737,157, filed Jan. 9, 2013, Shimbo et al.
Tsumura et al. "Estimation of Spectral Reflectances from Multi-Band Images by Multiple Regression Analysis" *Kougaku* vol. 27, No. 7 (1998), pp. 384-391.

* cited by examiner

US 8,908,176 B2

APPARATUS AND METHOD FOR OBTAINING SPECTRAL CHARACTERISTICS

BACKGROUND OF THE INVENTION

1. Field of the Invention

The present invention relates to an apparatus and a method for obtaining spectral characteristics.

2. Description of the Related Art

One of the important technical tasks of an image forming apparatus (e.g., printers, and printing apparatuses and like) is management of color tone including, for example, management of color stability and color reproduction. Recent image forming apparatuses have a spectral device (e.g., spectrometer) mounted thereon for performing color management. Within the recent image forming apparatuses, measurement of colorimetric values (e.g., XYZ or L*a*b* defined by CIE (International Commission On Illumination)), inspection of color tone of printed material, and adjustment of an image forming process are performed based on spectral reflectance from light diffused from a surface of a printed material measured by the spectral device.

The spectral device, which measures visible light, can output, for example, a discretized value of 31 or more bands detected from a light having a wavelength band ranging from 400 nm to 700 nm at intervals of 10 nm. In order to obtain optical intensity signals by temporally and spatially dividing diffuse reflection light to 31 or more, a substantial amount of time is required for measuring the spectral reflectance. Therefore, it is difficult to use the spectral device for an image forming apparatus performing high speed printing because detection speed is insufficient for performing inline measurement on an image at a rate corresponding to the printing speed.

Thus, there is a method of using a spectral device for detecting optical intensity signals from a comparatively small wavelength band of 3-16 (referred to as multi-band) in a case of measuring spectral reflectance from a measurement target (target to be measured) exhibiting a comparatively moderately changing spectral reflectance distribution. Thereby, spectral reflectance can be estimated from the measurement target according to the result of the detection of optical intensity signals (see, for example, Japanese Laid-Open Patent Publication No. 2009-219006). With this method, spectral reflectance can be estimated with high precision in a case where the measurement target is limited to an object from which statistical spectral reflectance data (statistical data pertaining to spectral reflectance) can be obtained beforehand (e.g., print image that can have its colors reproduced by combining 4 types of color material). Further, with this method, the time for detecting optical intensity signals can be reduced because the number of optical intensity signals to be detected is small. Accordingly, this method can be applied to a field requiring high speed measurement such as inline measurement of a print image.

It is preferable for the light source of the above-described spectral device to have high stability/long life-span in addition to having high luminance and high efficiency such as a white LED. However, the white LED is formed of an LED that emits blue light and a fluorescent material that absorbs the blue light and emits yellow light. In the spectral distribution of the white LED, the wavelength bands other than the two peaks of blue and yellow exhibit a low spectral luminance, and the white LED does not exhibit a uniform luminance throughout the entire visible wavelength range. Therefore, in a case where a light source such as white LED is used in the above-described spectral device for measuring a color with high precision, the precision of measuring a particular color may be significantly degraded. Further, in a case of performing high speed printing, it is difficult to change light exposure time with respect to bandwidths in accordance with the light quantity of each of the bandwidths. Therefore, the precision of estimating the spectral reflectance of a particular bandwidth may be significantly degraded.

Accordingly, Japanese Laid-Open Patent Publication No. 2009-219006 proposes a spectral reflectance deriving apparatus for deriving a spectral reflectance of a reproduction output object that is close (similar) to the spectral reflectance of a reproduction target even with different light sources by using a spectral reflectance decomposition method and a spectral reflectance estimation model and assuming that the color difference between the reproduction target and the reproduction output object is almost 0 where a particular light source is used in a printing apparatus or the like.

However, with the spectral reflectance deriving apparatus of Japanese Laid-Open Patent Publication No. 2009-219006, it becomes necessary to perform decomposition on the spectral reflectance target by using the spectral decomposition method, so that error can be minimized. This makes it difficult to estimate the spectral reflectance of the measurement object with high precision and high speed.

Although the above-described difficulty may be resolved by a method of using a light source capable of uniformly illuminating the entire wavelength range to be measured or a method of using a sensor capable of detecting a particular bandwidth with high sensitivity, these methods increase, for example, manufacturing cost.

SUMMARY OF THE INVENTION

The present invention may provide an apparatus and a method for obtaining spectral characteristics that substantially obviate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by an apparatus and a method for obtaining spectral characteristics particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a spectral characteristic obtaining apparatus including: a detection unit configured to detect light quantities in plural wavelength bands from a measurement target; a storage unit configured to store pre-obtained spectral characteristics of the measurement target; a calculation unit configured to calculate a primary transformation matrix from the light quantities and the pre-obtained spectral characteristics of at least one reference sample and a secondary transformation matrix from one of the pre-obtained spectral characteristics corresponding to a primary wavelength band and another one of the pre-obtained spectral characteristics corresponding to a second wavelength band; an estimation unit configured to estimate the spectral characteristics of the measurement target by performing a primary estimation on the light quantities in the plural wavelength bands by using the primary transformation matrix, performing a secondary estimation on a result of the primary estimation by using the secondary transformation matrix, and compositing a result of the secondary estimation with the result of the primary estimation.

Other objects, features and advantages of the present invention will become more apparent from the following detailed description when read in conjunction with the accompanying drawings.

DETAILED DESCRIPTION OF THE PREFERRED EMBODIMENTS

Figure 1:
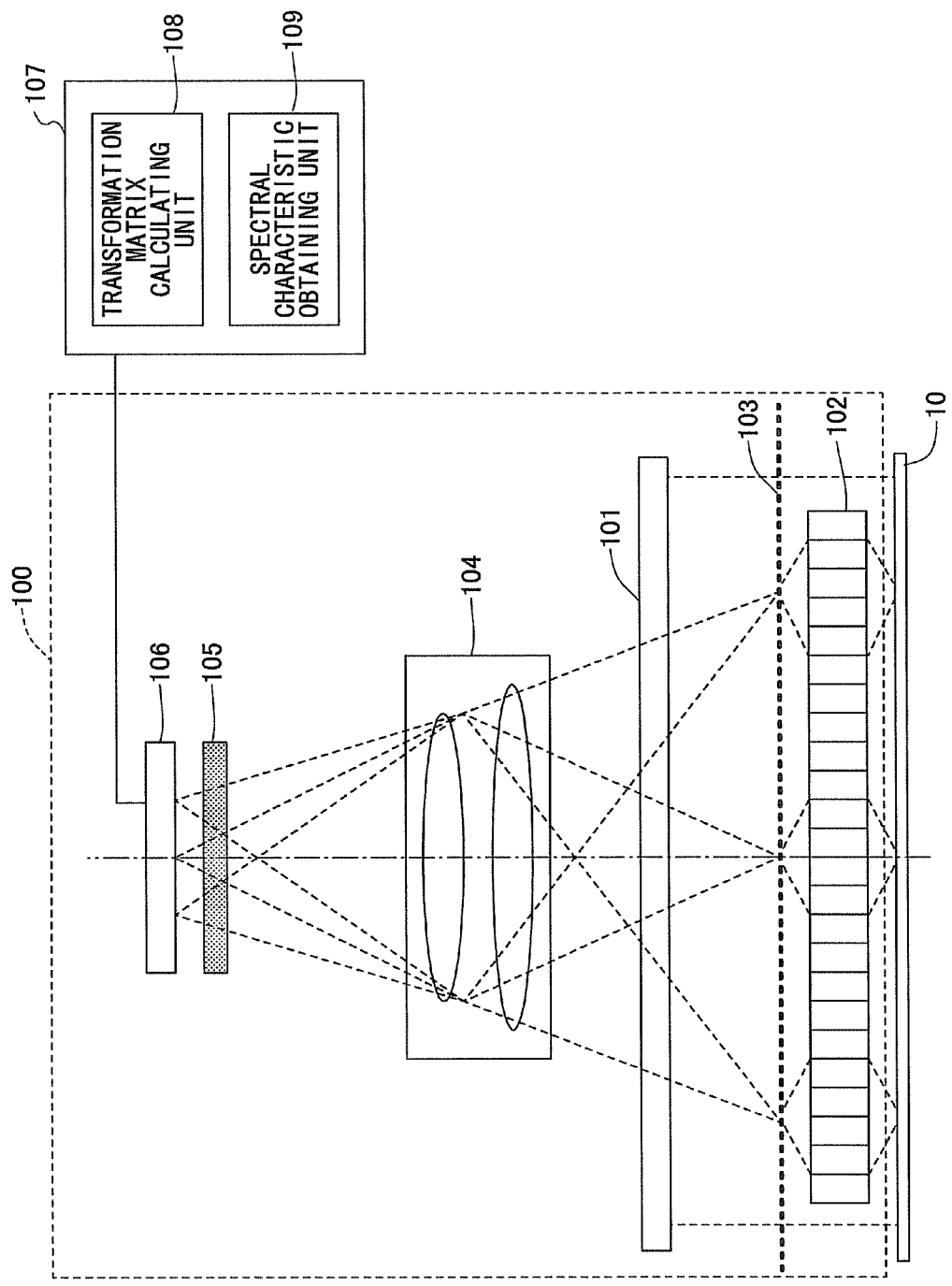
FIG. 1 is a schematic diagram illustrating an example of a configuration of a spectral characteristic obtaining apparatus according to the first embodiment.

Next, embodiments of the present invention are described with reference to the drawings. In the drawings, like components are denoted by like reference numerals throughout the drawings.

<Method for Estimating Spectral Characteristics>

First, before describing embodiments of the present invention, a method for estimating spectral characteristics is described. In the present application, the term "spectral characteristics" refers to the light quantity of diffused reflection light being expressed as a function of wavelength. Further, the term "spectral characteristics" includes spectral reflectance.

As described above, in a case where a measurement target exhibits a comparatively moderately changing spectral reflectance distribution, spectral reflectance of the measurement target can be estimated from the light quantities of a comparatively small number of wavelength bands (e.g., approximately 3-16 bands) (referred to as multi-bands) detected by a photosensitive sensor such as a CCD (Charge Coupled Device). Because this method of estimating spectral reflectance performs estimation from light quantities detected from a small number of wavelength bands, the time for measuring spectral reflectance can be shortened. Therefore, this estimation method is suitable for a field required to perform high-speed measurement (e.g., inline measurement) on, for example, a print image.

The spectral reflectance estimation method is performed by obtaining a transformation matrix that transforms detected light quantities into spectral reflectance by using measurement results of multiple color samples from which their spectral reflectance have already been obtained beforehand and estimating spectral reflectance of a measurement sample by using the transformation matrix on a light quantity detected from the measurement sample.

As known methods for obtaining (calculating) the transformation matrix, there are, for example, a low dimension linear approximation method, a Wiener estimation method, a non-linear estimation method using a neural network or the like, and a multiple regression analysis method. Among such known methods, a transformation matrix calculating method using the multiple regression analysis method is described below.

A column vector r of a spectral reflectance of each of wavelength band (e.g., 31 bands in a wavelength range of 400 nm to 700 nm at intervals of 10 nm) can be expressed with the following [Equation 1] wherein "v" indicates a column vector storing sensor output vi (i=1 to N) obtained from N pixels corresponding to the sensor parts constituting a single spectral sensor, and "G" indicates a transformation matrix.

[Equation 1]

$$r = Gv \quad (1)$$

As illustrated in the following [Equation 2] to [Equation 4], the transformation matrix can be obtained by minimizing a square norm $\|\cdot\|2$ of error by using a least square method based on "R" indicating a matrix storing a spectral distribution of multiple (n) samples from which their spectral reflectance is obtained beforehand (known spectral reflectance) and "V" indicating a matrix storing a signal output obtained by measuring the light quantities of the multiple samples with a spectral device.

[Equation 2]

$$R = [r1, r2, \ldots, rn] \quad (2)$$

[Equation 3]

$$V = [v1, v2, \ldots, vn] \quad (3)$$

[Equation 4]

$$e = \|R - GV\|2 \rightarrow \min \quad (4)$$

As illustrated in the following [Equation 5], a regression coefficient matrix G (a regression formula of V to R assuming that "V" is an explanatory variable and "R" is an objective variable) by using a generalized inverse matrix of Moore-Penrose (which provides a least squares norm solution of matrix V.

[Equation 5]

$$G = RV^t(VV^t)^{-1} \quad (5)$$

In [Equation 5], the superscript "t" indicates a transposed matrix, and the superscript "−1" indicates an inverse matrix. In calculating the inverse matrix, a typical singular value decomposition method may be used. Thus, at the time of actually measuring a given measurement target with the spectral sensor, the spectral reflectance "r" of the measurement target can be obtained by storing "G" obtained by [Equation 5] beforehand and then obtaining the product of the transformation matrix G and the signal output v of the spectral sensor.

An output response vi from a multi-band spectral sensor can be expressed with the following [Equation 6] wherein "r (λ)" indicates a spectral reflectance of a measurement target, "E (λ)" indicates a spectrum of a light source radiating light to the measurement target, "L (λ)" indicates transmittance of an imaging lens, and "Si (λ)" indicates a spectral transmittance distribution of each pixel according to the spectral function of a diffraction element and spectral sensitivity distribution of a photosensitive element.

[Equation 6]

$$vi = \int Si(\lambda)E(\lambda)L(\lambda)r(\lambda)d\lambda \quad (6)$$

Figure 22:
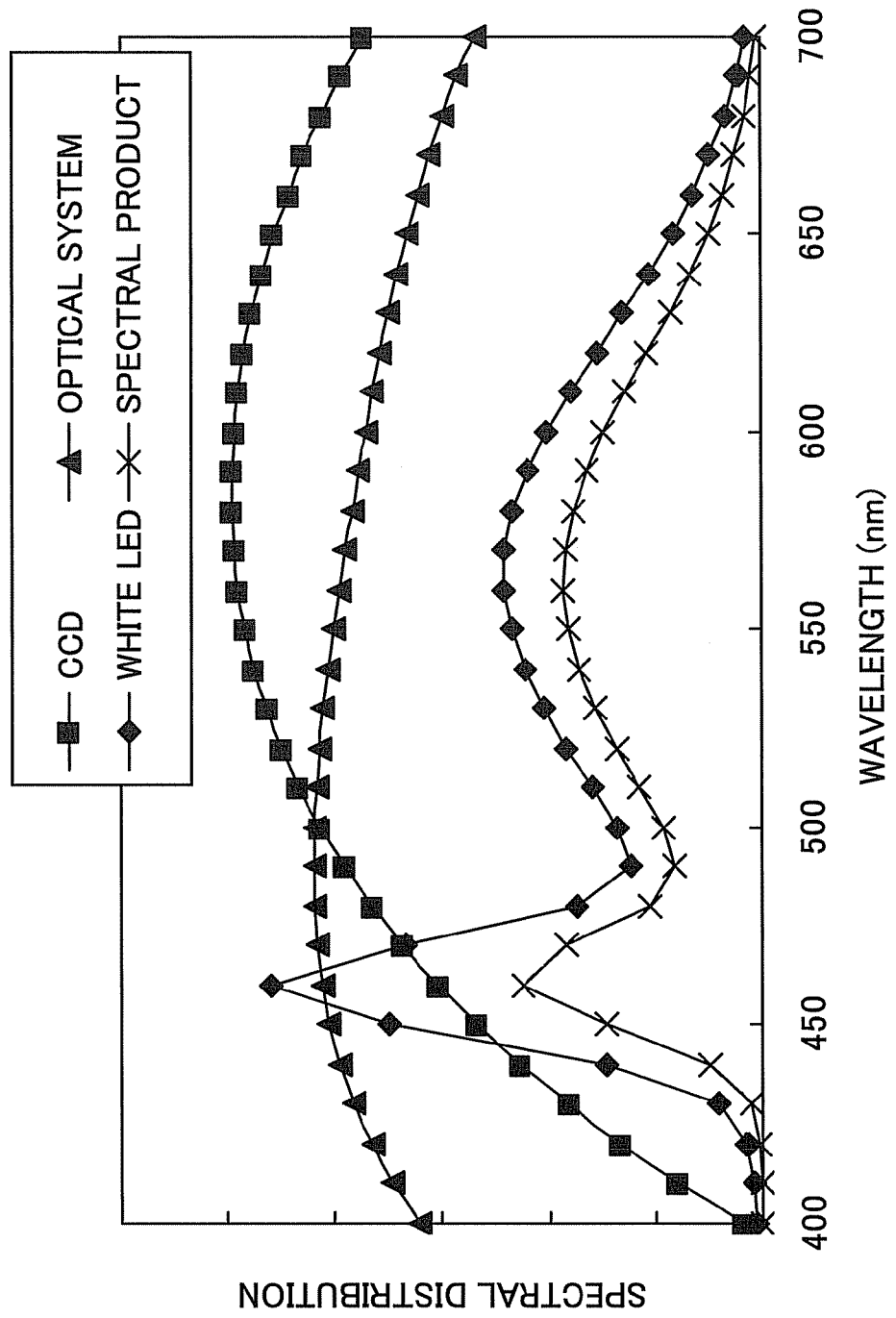
FIG. 22 is a schematic diagram illustrating an example of a spectral product according to an embodiment of the present invention.

In the example of FIG. 22, "spectral product" refers to a product obtained by multiplying Si (λ), E (λ), and L (λ) together for each wavelength band. That is, the example of FIG. 22 illustrates a spectrum of a white LED (Light Emitting Diode) (E (λ)), a spectral transmittance of an optical system (L (λ)), and a spectral sensitivity characteristic of a CCD used as a photosensitive element (Si (λ)), and the product of Si (λ), E (λ), and L (λ).

In a case where a white LED is used as a light source, the spectral product is small in at a short wavelength area of approximately 450 nm or less and at a long wavelength area of approximately 650 nm as illustrated in FIG. 22. Generally, signals output from the photosensitive element receiving light reflected from a measurement target are subjected to superposing of random noise due to dark current or the like. This leads to degrading of SN ratio of the output detected from a photosensitive element receiving light of a wavelength band having a small spectral product. As a result, the precision of estimating spectral reflectance may be degraded.

However, with the below-described embodiments of the present invention, the precision of estimating spectral reflectance can be improved while enabling high-speed measurement of spectral characteristics even in a case where, for example, a white LED is used as a light source in which the spectral product is small.

First Embodiment

With a spectral characteristic obtaining apparatus 1 according to the first embodiment of the present invention, spectral reflectance is estimated by using a primary transformation matrix for estimating spectral reflectance and a secondary transformation matrix for precisely estimating, for example, spectral reflectance of a wavelength band having a small spectral product. Thereby, the spectral characteristic obtaining apparatus 1 according to the first embodiment can obtain spectral reflectance of a measurement target with high precision and at high speed.

<Configuration of Spectral Characteristic Obtaining Apparatus>

FIG. 1 is a schematic diagram illustrating an example of a configuration of the spectral characteristic obtaining apparatus 1 according to the first embodiment.

The spectral characteristic obtaining apparatus 1 includes a spectral device (spectroscope) 100 and an operation unit 107. The spectral device 100 includes a linear illumination source (illumination unit) 101, a first imaging optical system 102, an aperture array (area dividing unit) 103, a second imaging optical system 104, a diffraction unit (spectral diffraction unit) 105, and a linear sensor (detection unit) 106. The operation unit 107 includes a transformation matrix calculating unit 108 and a spectral characteristic obtaining unit 109.

The linear illumination source 101 radiates linear light spreading in a width direction with respect to a measurement target 10. The measurement target 10 may be, for example, a sheet of paper having an image formed on its surface. In this embodiment, the linear illumination source 101 is an array of white LEDs having intensity throughout almost the entire range of visible light. Alternatively, a lamp such as a fluorescent lamp (e.g., cold cathode tube) may be used as the linear illumination source 101. It is, however, preferable for the linear illumination source 101 to radiate light in a wavelength band required for performing spectral diffraction and to uniformly radiate light throughout the entire measurement range (range subjected to measurement of light quantity).

The first imaging optical system 102 is a cell (registered trademark) lens array that images reflected light from the measurement target 10 to the aperture array 103. Alternatively, a micro-lens array may be used as the first imaging optical system 102.

The aperture array 103, which includes multiple apertures arranged in a single row, is positioned near the measurement target 10. A blocking part(s), which blocks light, is formed in a portion of the aperture array 103 other than the portions where the multiple apertures are formed. Accordingly, the light radiated from the linear illumination source 101 and reflected from the measurement target 10 is divided into multiple regions by the apertures of the aperture array 103. The aperture array 103 may be, for example, a pin hole array or a slit array. The aperture array 103 may be formed of, for example, metal or a black resin having multiple apertures formed therein. Alternatively, the aperture array 103 may be formed by coating a patterned metal film or a patterned black resin film on a glass material or a transparent resin material. The shape of the apertures of the aperture arrays 103 is not limited to a circular shape or a rectangular shape. For example, the apertures of the aperture array 103 may be an elliptical shape.

The second imaging optical system 104 includes multiple lenses. The second imaging optical system 104 functions as an imaging unit that images reflected light transmitted through the aperture array 103 and incident on a light receiving surface of the linear sensor 106 via the diffraction element 105. For example, a lens of an optical system of a typical scanner or a lens of an industrially used linear sensor may be used as the lens of the second imaging optical system 104. The dotted line of FIG. 1 is for schematically illustrating a representative optical path after the light emitted to the measurement target 10 is diffuse reflected therefrom.

The linear sensor 106 is a multi-band spectral sensor having multiple arranged spectral sensors including N elements. The linear sensor 106 functions as a photosensitive unit that obtains the light quantity of each particular multiple wavelength band from the incident reflected light via the diffraction unit 105. The linear sensor 106 may be, for example, a MOS (Metal Oxide Semiconductor Device), a CMOS (Complimentary Metal Oxide Semiconductor Device), a CCD (Charge Coupled Device), or a PDA (Photo Diode Array).

<Functional Block Diagram of Spectral Characteristic Obtaining Apparatus>

Figure 2:
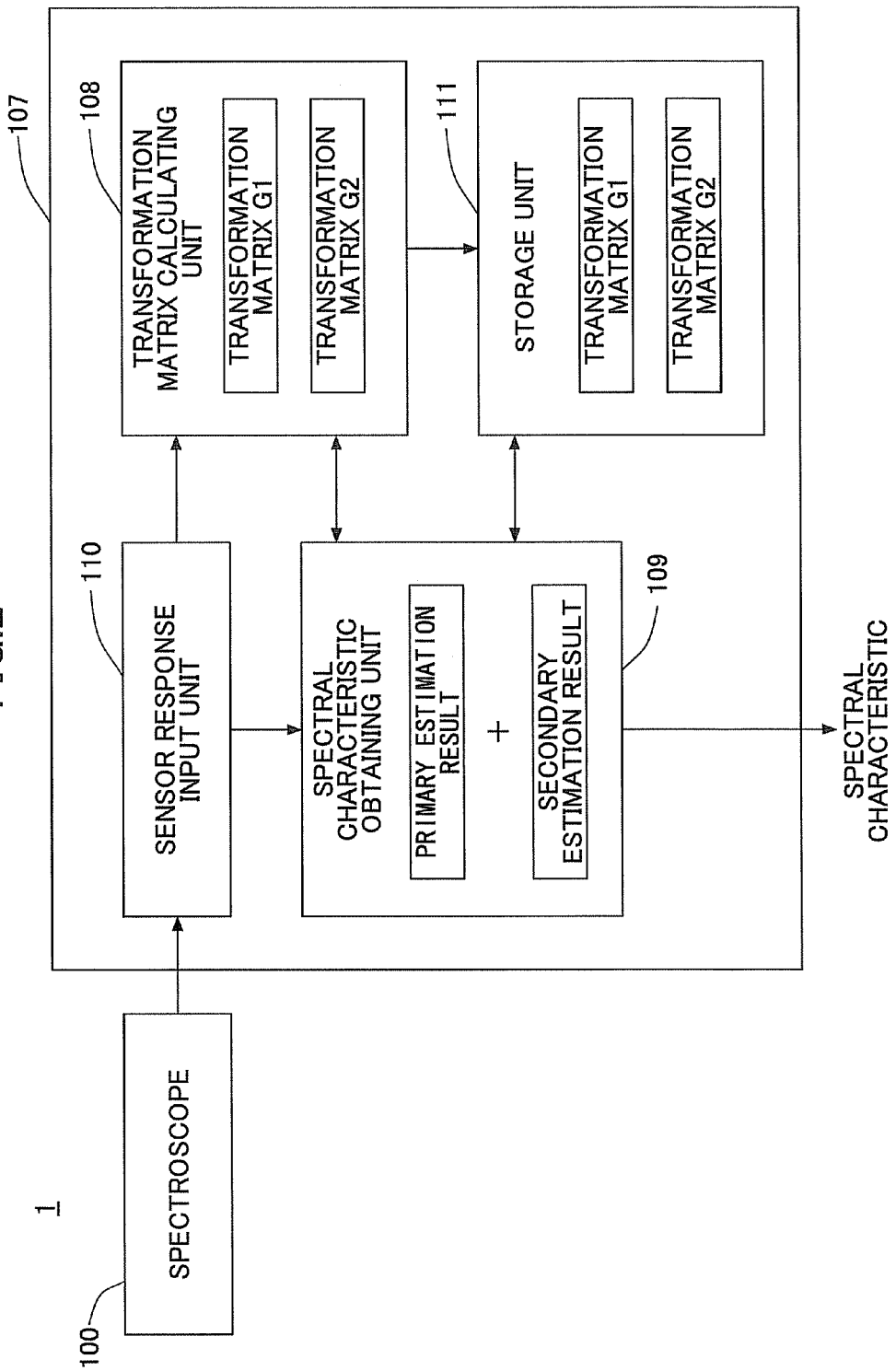
FIG. 2 is a functional block diagram for describing the function of each part of the spectral characteristic obtaining apparatus according to the first embodiment of the present invention.

FIG. 2 is a functional block diagram for describing the function of each part of the spectral characteristic obtaining apparatus 1 according to the first embodiment of the present invention.

The light quantity of the diffuse reflected light obtained from the measurement target 10 by the linear sensor 106 of the spectral characteristic obtaining apparatus 1 is transmitted to a sensor response input unit 110 included in the operation unit 107, and further transmitted from the sensor response input unit 110 to the transformation matrix calculating unit 108 and the spectral characteristic obtaining unit 109.

The operation unit 107 includes, for example, a CPU (Central Processing Unit), a ROM (Read Only Memory), and a main memory. Each of the functions of the operation unit 107 is performed by loading a program stored in the ROM or the like to the main memory and causing the CPU to execute the program. Alternatively, a part of or all of the functions of the operation unit 107 may be performed with other hardware. Further, a part of or all of the functions of the operation unit 107 may be performed not only by a single apparatus but also by multiple physical apparatuses.

<<Calculation of Transformation Matrix>>

The transformation matrix calculating unit 108 calculates a transformation matrix from the measurement results of reference samples of multiple colors by using [Equation 5]. As described below, the spectral reflectance of each of the reference samples is known beforehand (pre-obtained spectral reflectance).

Figure 3:
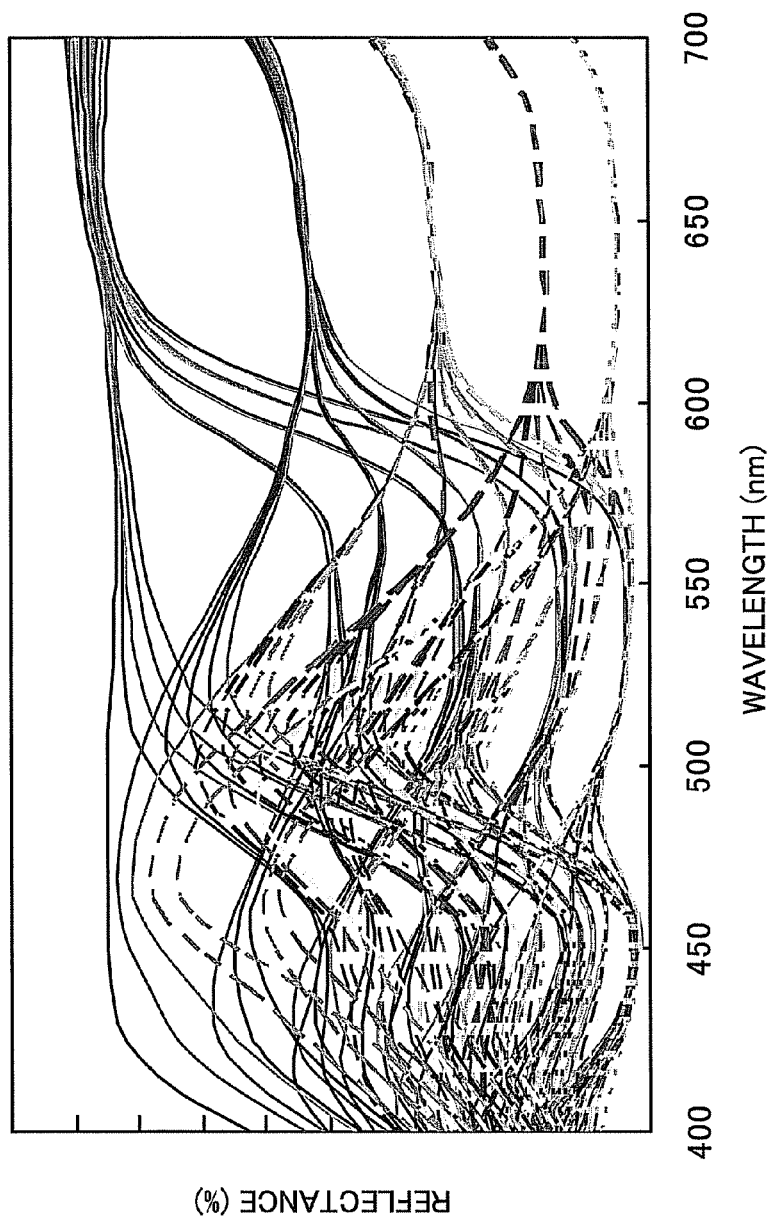
FIG. 3 is a schematic diagram illustrating an example of spectral reflectance of reference samples.

FIG. 3 is a schematic diagram illustrating an example of the spectral reflectance of reference samples. That is, FIG. 3 illustrates an example of measurement results obtained by measuring the spectral reflectance of reference samples of 125 different colors. In the example of FIG. 3, the spectral reflectance is obtained in a wavelength range of 400 nm to 700 nm at intervals of 10 nm by using a high precision spectral device (spectroscope). The spectral characteristic obtaining apparatus 1 stores the measurement results of the spectral reflectance (pre-obtained spectral reflectance) of the reference samples in the storage unit 111.

Figure 4:
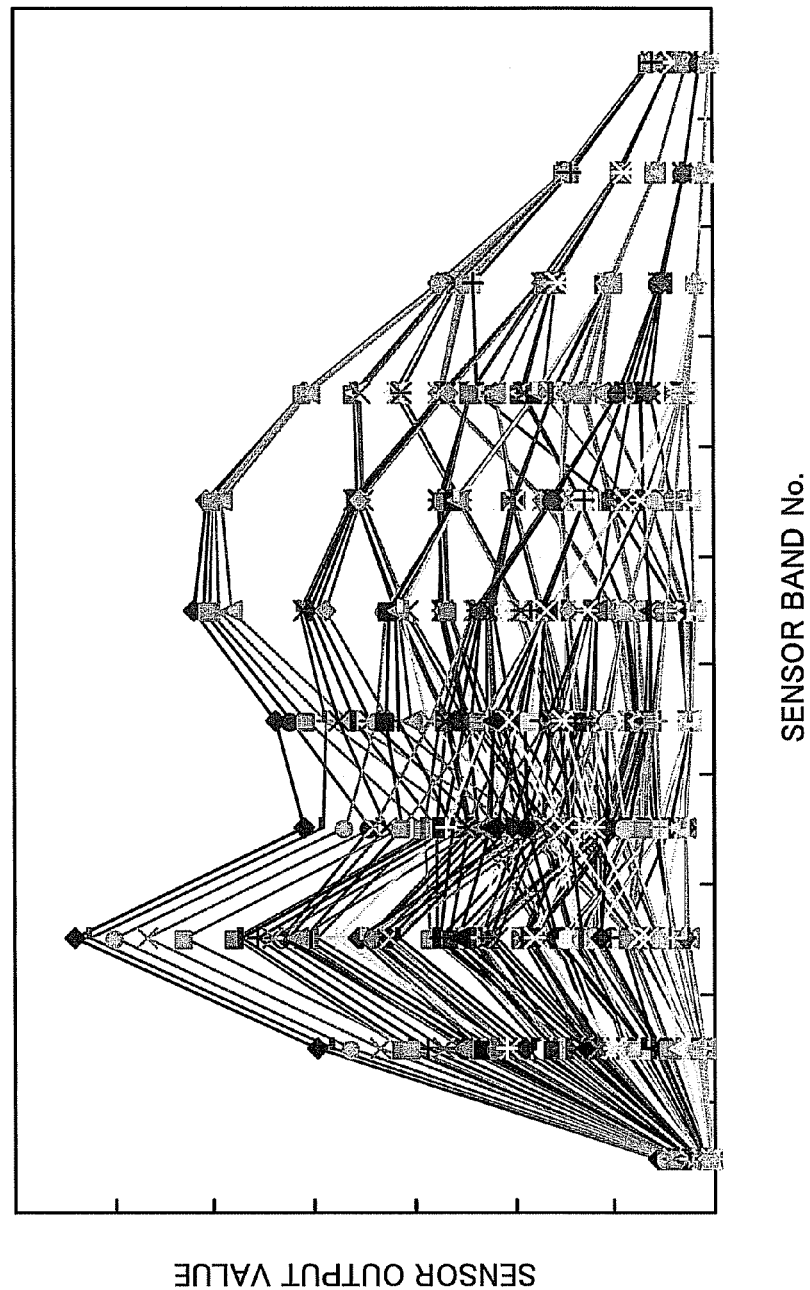
FIG. 4 is a schematic diagram illustrating an example of sensor output detected from the reference samples by the spectral characteristic obtaining apparatus according to an embodiment of the present invention.

Next, an example of sensor output detected from the reference samples by the spectral characteristic obtaining apparatus 1 is described with reference to FIG. 4. FIG. 4 is a schematic diagram illustrating an example of sensor output detected from the reference samples by the spectral characteristic obtaining apparatus 1 according to an embodiment of the present invention.

The linear sensor 106 of the spectral characteristic obtaining apparatus 1 includes a spectral sensor that uses sensors (elements) corresponding to 11 pixels to obtain light in the visible light range. A sensor of the linear sensor 106 corresponding to a pixel having a low band number (No.) detects visible short wavelength band light (visible light of a short wavelength band), and a sensor of the linear sensor 106 corresponding to a pixel having a high band number (No.) detects visible long wavelength band light (visible light of a long wavelength band).

The transformation matrix calculating unit 108 generates a matrix R1 indicated in [Equation 2] from the pre-obtained spectral reflectance of the reference samples illustrated in FIG. 3 and generates a matrix V1 indicated in [Equation 2] from sensor output values of the reference samples illustrated in FIG. 4 (values of visible light detected from the reference samples by the linear sensor 106. Then, the transformation matrix calculating unit 108 calculates a transformation matrix (primary transformation matrix) G1 by applying [Equation 5] to the generated matrices R1 and V1.

Figure 5:
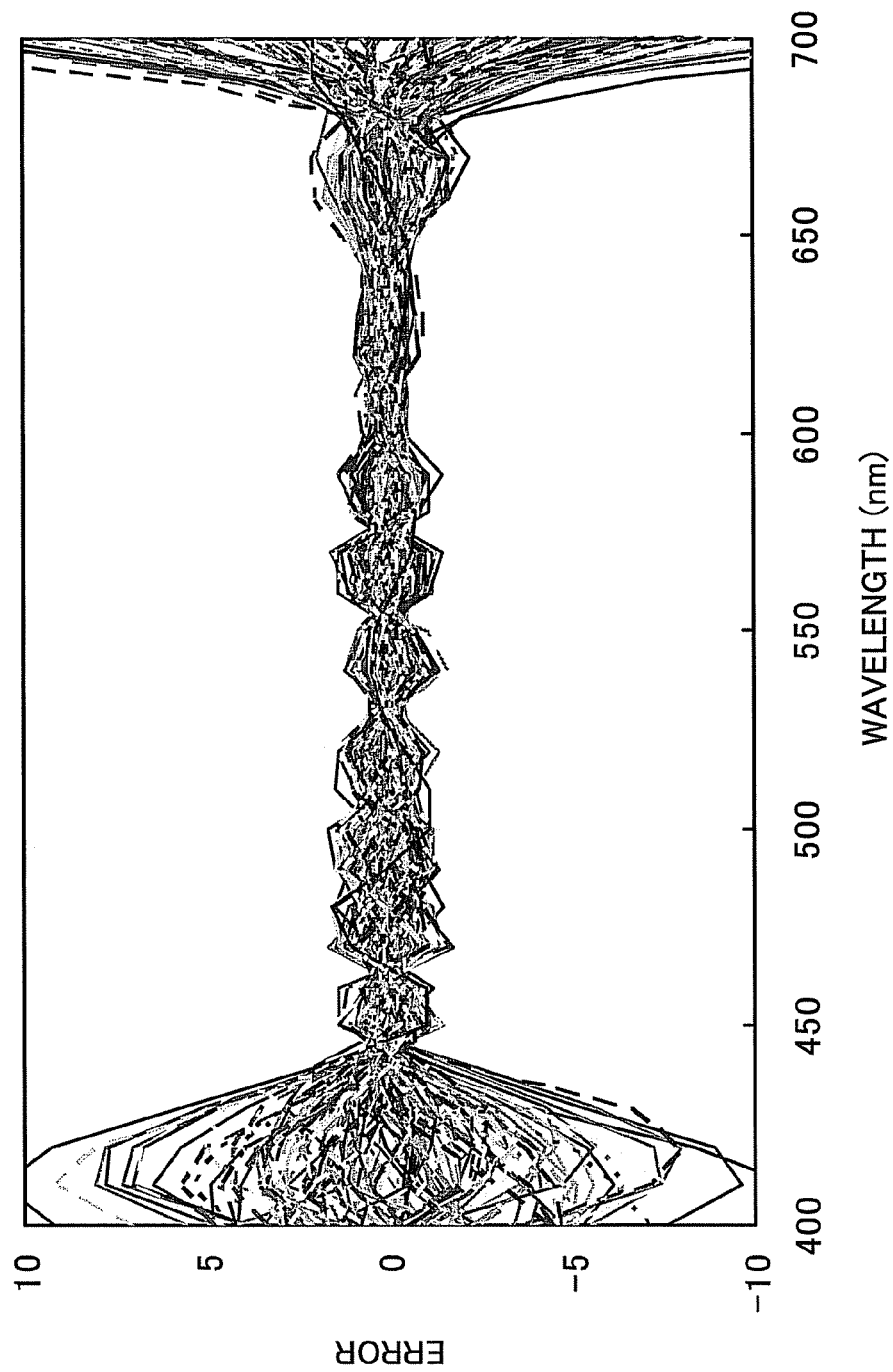
FIG. 5 is a schematic diagram illustrating the error of the results of estimating spectral reflectance of the reference samples (first example)

Then, the spectral reflectance of the reference samples is estimated from the sensor output values of the reference samples by using the calculated transformation matrix G1. FIG. 5 illustrates an example of the results of obtaining the error between the pre-obtained spectral reflectance of the reference samples of FIG. 3 and the estimated spectral reflectance of the reference samples using the transformation matrix G1. As illustrated in FIG. 5, the error in a short wavelength band no greater than approximately 450 nm and the error in a long wavelength band no less than 670 nm are large compared to other wavelength bands. The results of FIG. 5 correspond to the above-described case where the spectral product is small in at a short wavelength area of approximately 450 nm or less and at a long wavelength area of approximately 650 nm as illustrated in FIG. 22. The results of FIG. 5 is caused by the degradation of the precision in estimating spectral reflectance due to the spread of noise components of the wavelength bands having small SN ratio.

Accordingly, the transformation matrix calculating unit 108 generates a matrix R2 indicated in [Equation 2] is generated by referring to, for example, the pre-obtained spectral reflectance of the reference samples and extracting values of a wavelength band exhibiting a large error (e.g., 400 nm-440 nm) relative to the estimation results using the transformation matrix G1 (primary estimation results). Further, the transformation matrix calculating unit 108 generates a matrix V2 indicated in [Equation 3] by referring to, for example, the pre-obtained spectral reflectance of the reference samples and extracting values of wavelength bands exhibiting a small error (e.g., 450 nm, 550 nm, 650 nm) relative to the estimation results using the transformation results G1. Further, the transformation matrix calculating unit 108 calculates a transformation matrix (secondary transformation matrix) G2 based on the [Equation 5].

Figure 6:
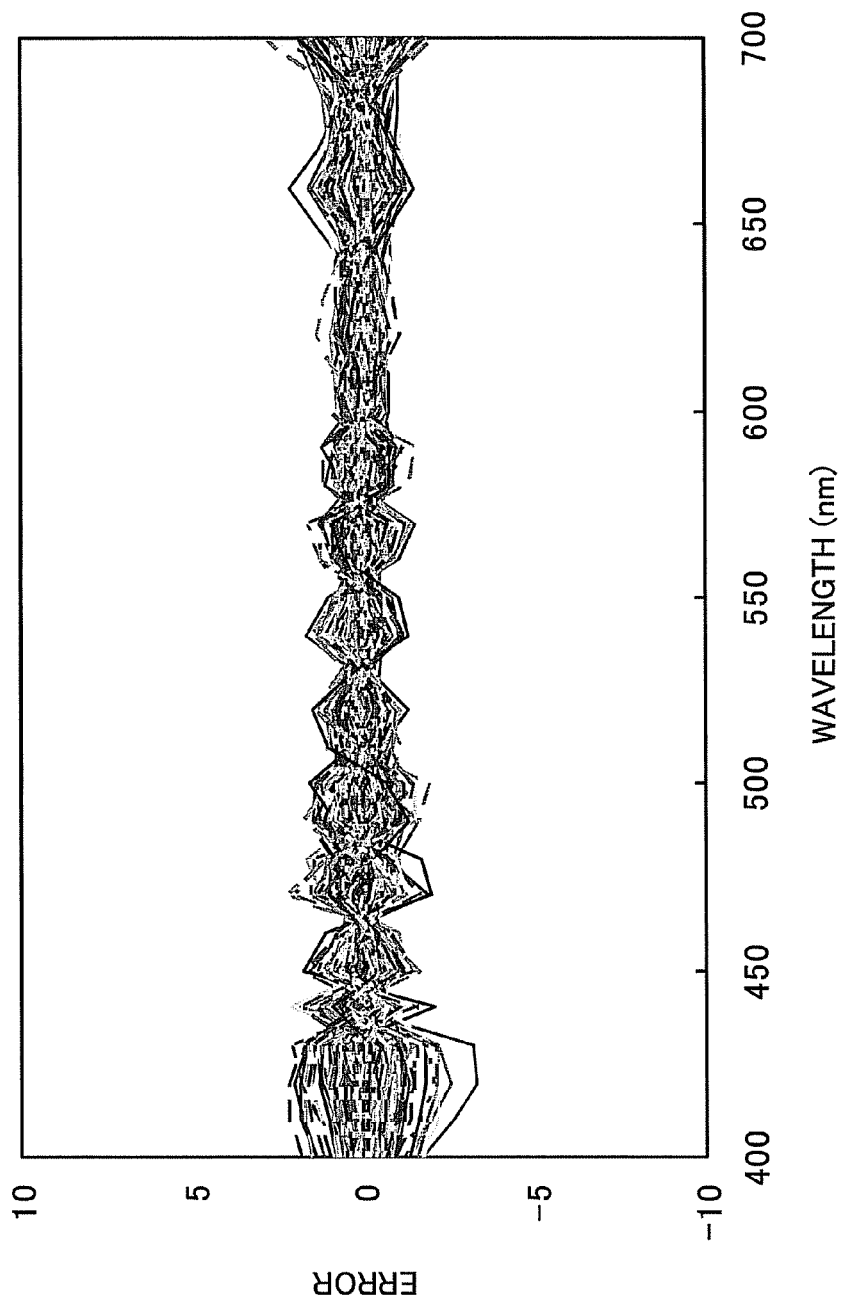
FIG. 6 is a schematic diagram illustrating the error of the results of estimating spectral reflectance of the reference samples (second example)

FIG. 6 illustrates an example of the result of estimating the spectral reflectance of a wavelength band range 400 nm-440 nm from the values of wavelength bands 450 nm, 550 nm, and 650 nm of the primary estimation results of the reference samples by using the transformation matrix G2 and obtaining an error (difference) of the estimated spectral reflectance of the wavelength band 400 nm-440 nm relative to the pre-obtained spectral reflectance illustrated in FIG. 3. As illustrated in FIG. 6, it can be understood that the error of the short wavelength range (400 nm-450 nm) decreases by using the transformation matrix G2. Accordingly, the precision of estimating spectral reflectance is improved. Likewise, the example of FIG. 6 indicates that the error of the long wavelength range (670 nm-700 nm) decreases by generating a matrix R2' indicated in [Equation 2], generating a matrix V2' indicated in [Equation 3] by referring to, for example, the pre-obtained spectral reflectance of the reference samples and extracting values of wavelength bands exhibiting a small error (e.g., 630 nm, 650 nm) relative to the estimation results using the transformation results G1, calculating a transformation matrix (secondary transformation matrix) G2' based on the [Equation 5], and estimating the spectral reflectance of the wavelength bands 670-700 nm from the primary estimation values by using the transformation matrix G2'.

Figure 7:
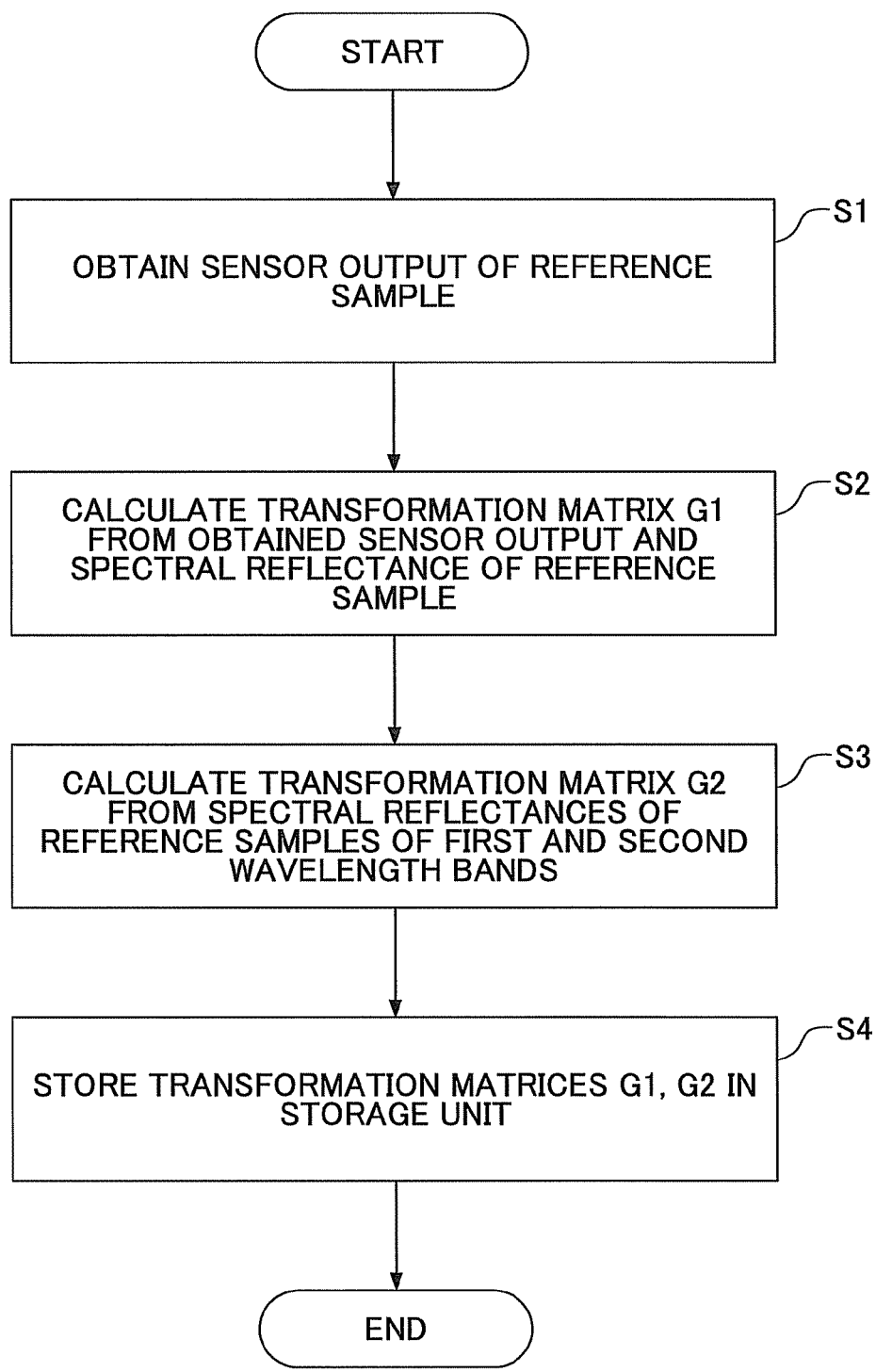
FIG. 7 is a flowchart illustrating a transformation matrix calculating operation according to the first embodiment of the present invention.

Accordingly, the transformation matrix calculating unit 108 calculates the primary transformation matrix G1 and the secondary transformation matrix G2 for estimating the spectral reflectance of the measurement target 10. Next, the processes of the transformation matrix calculating unit 108 is described by referring to FIG. 7. FIG. 7 is a flowchart illustrating an example of a transformation matrix calculating operation according to an embodiment of the present invention.

First, in Step S1, sensor output of reference samples are obtained from the sensor response input unit 110. Then, a transformation matrix G1 is calculated by using the sensor output of the reference samples and the pre-obtained spectral reflectance of the reference samples stored in the storage unit 111 (Step S2). Then, a transformation matrix G2 is calculated from the spectral reflectance of the reference samples of a primary wavelength band (e.g., 450 nm, 550 nm, 650 nm) and the spectral samples of a secondary wavelength band (e.g., 400 nm-450 nm). Then, the calculated transformation matrices G1 and G2 are stored in the storage unit 111. Thereby, the process of calculating the transformation matrices is completed.

It is to be noted that the wavelength bands for calculating the transformation matrix G2 is not limited to those described above. For example, in a case where the required colorimetric values are XYZ or L*a*b* defined by CIE (International Commission On Illumination)), it is preferable to select from a combination of bandwidths in which estimation error (e.g., color difference ΔE) is minimal. Although 3 wavelengths (explanatory variable) in the short wavelength band is used for estimating 4 wavelengths (objective variable) in the short wavelength band, generally, the precision of estimation can be improved in a case where the number of explanatory variables used is greater than the number of objective variables used. Further, the precision of estimation can be improved by expanding the explanatory variable to a square term or an interaction term.

<<Estimation of Spectral Reflectance>>

The spectral reflectance of the measurement target 10 can be obtained by way of estimation using the sensor output of the linear sensor 106 and the transformation matrices G1 and G2 calculated by the transformation matrix calculating unit 108.

Next, an example of estimation of spectral reflectance by the spectral characteristic obtaining unit 109 is described.

First, the linear sensor 106 of the spectral device 100 obtains the light quantity of each wavelength band of a measurement sample. The obtained light quantities (sensor output) output from the linear sensor 106 is input to the sensor response input unit 110. The spectral characteristic obtaining unit 109 performs a primary estimation of spectral reflectance R1' by applying the transformation matrix G1 stored in the storage unit 111 to [Equation 1].

Figure 8:
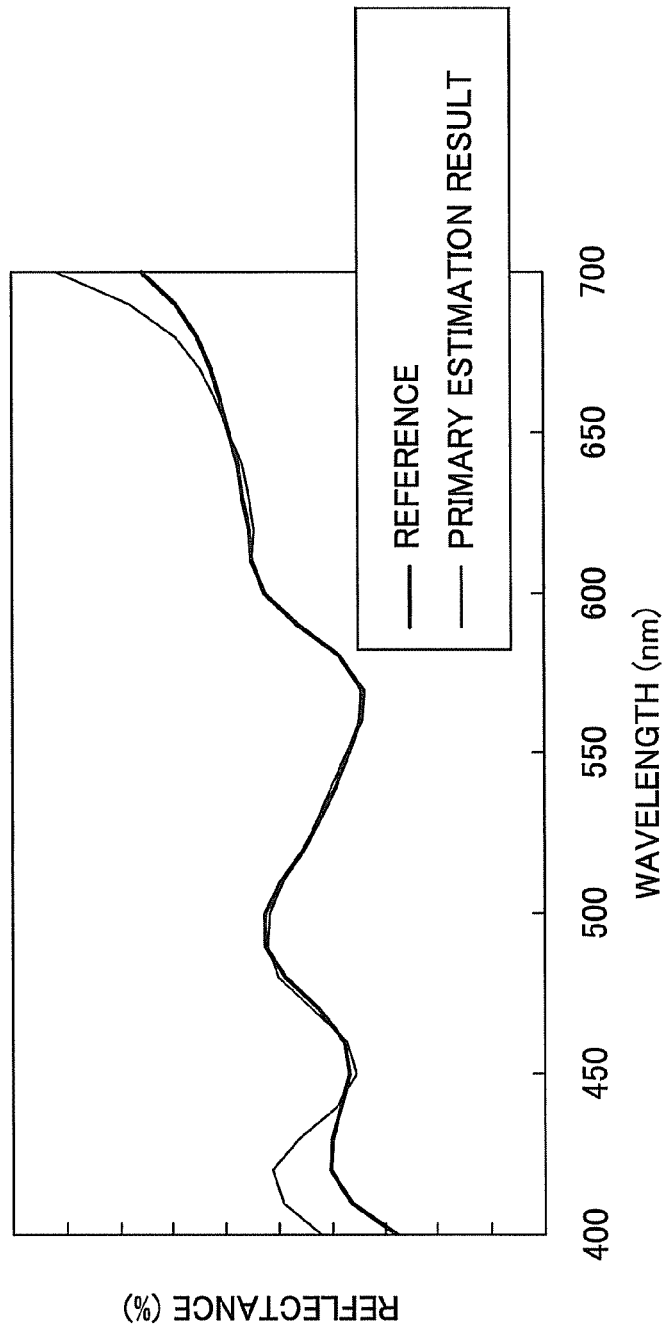
FIG. 8 is a schematic diagram illustrating an example of a primary estimation result by a spectral characteristic obtaining unit and a spectral reflectance of a measurement sample.
Figure 9:
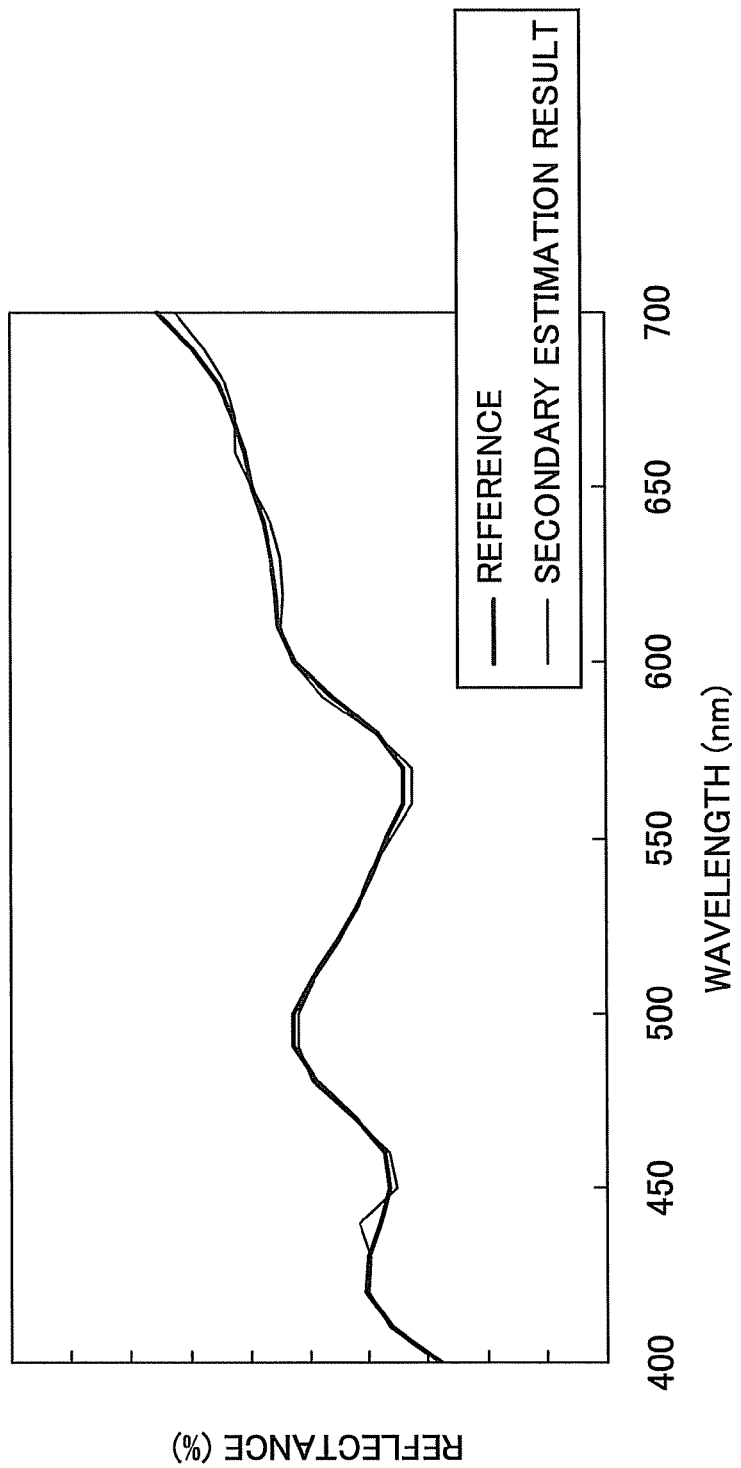
FIG. 9 is a schematic diagram illustrating an example of a secondary estimation result by a spectral characteristic obtaining unit and a spectral reflectance of a measurement sample.
Figure 10:
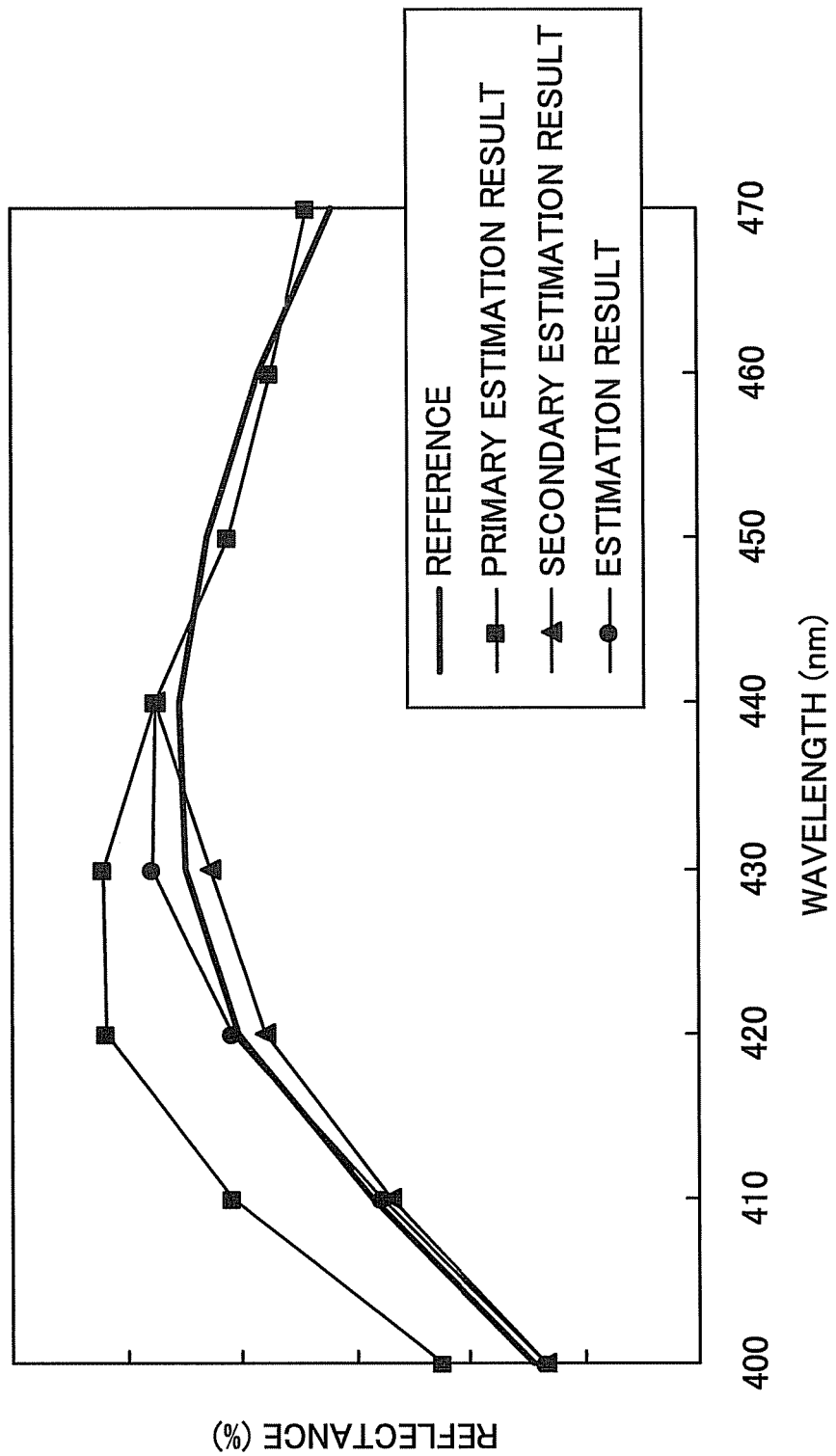
FIG. 10 is a schematic diagram illustrating an example of compositing primary and secondary estimation results.

FIG. 8 is a schematic diagram illustrating an example of the primary estimation results by the spectral characteristic obtaining unit 109 and the spectral reflectance of the measurement sample. In FIGS. 8 to 10, the spectral reflectance of the measurement sample is indicated as "reference".

As illustrated in FIG. 8, the primary estimation results using the transformation matrix G1 indicate that the estimation results in the short wavelength band range of approximately 400 nm-450 nm and the estimation results in the long wavelength band range of approximately 670 nm or more have large error.

Next, the spectral characteristic obtaining unit 109 performs secondary estimation of spectral reflectance of the measurement sample by using the transformation matrix G2 and the values of the primary estimation results. FIG. 9 illustrates an example of the secondary estimation results by the spectral characteristic obtaining unit 109 and the spectral reflectance of the measurement sample. FIG. 9 indicates that error is reduced in the short wavelength band range of approximately 400 nm-450 nm and in the long wavelength band range of approximately 670 nm or more by using the transformation matrix G2.

Finally, the spectral reflectance obtaining unit 109 obtains the spectral reflectance of the measurement sample by compositing (combining) the primary and secondary estimation results.

In compositing of the primary and secondary estimation results according to an embodiment of the present invention, either one or both of the primary and secondary estimation results is weighted and combined to the other. FIG. 10 is a schematic diagram illustrating an example of compositing the primary and secondary estimation results. In the example of FIG. 10, the spectral reflectance of four points in a 400 nm-430 nm wavelength is obtained where both the primary and secondary estimation results are weighted and composited with each other.

Although the compositing of the primary and secondary estimation results may be performed by simple replacement (permutation), the continuity of spectrum may be lost due to the replacement. Thus, the loss of continuity of the spectrum can be reduced by weighting the primary and secondary estimation results. Alternatively, the compositing of the primary and secondary estimation results may be performed by using an interpolation method (e.g., spline interpolation) in order to maintain the continuity of the spectrum.

Figure 11:
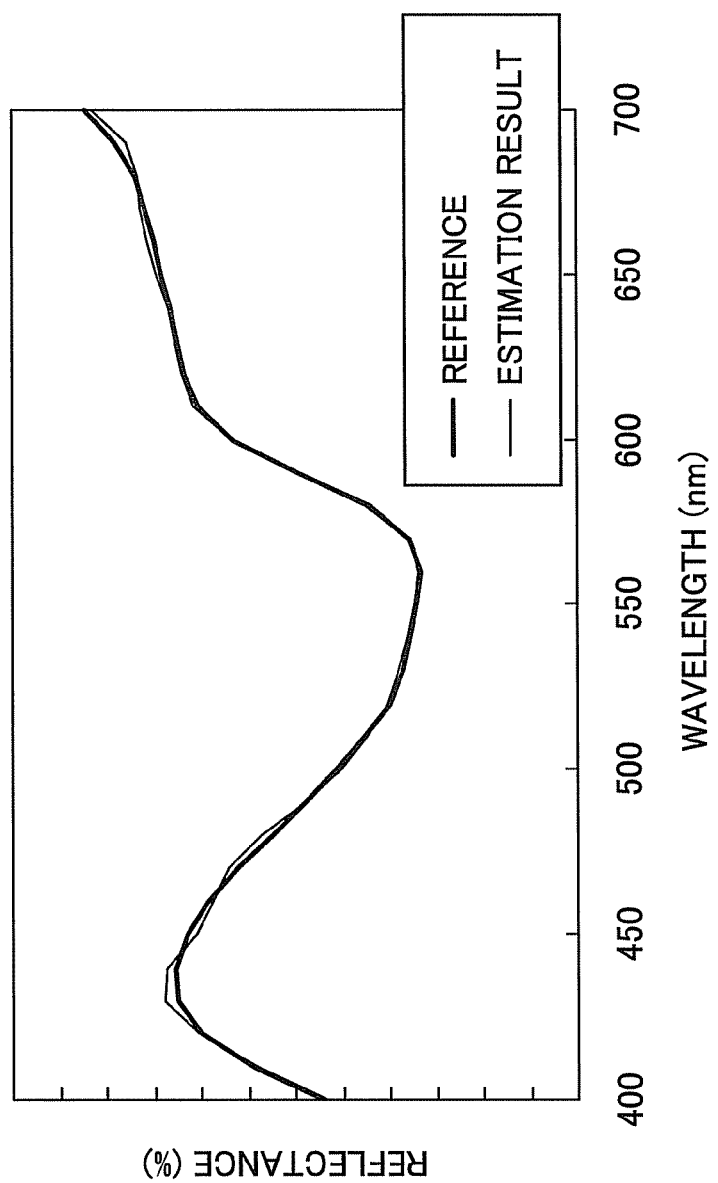
FIG. 11 is a schematic diagram illustrating an example of the results of estimating spectral reflectance by compositing primary and secondary estimation results with the spectral characteristic obtaining unit and the spectral reflectance of the measurement sample according to an embodiment of the present invention.

FIG. 11 is a schematic diagram illustrating an example of the results of estimating spectral reflectance by compositing the primary and secondary estimation results with the spectral characteristic obtaining apparatus 1 and the spectral reflectance of the measurement sample. As illustrated in FIG. 11, it can be understood that spectral reflectance of the measurement sample can be precisely estimated in all the bandwidths by weighting and compositing the primary estimation results (obtained by using the primary transformation matrix) and the secondary estimation results (obtained by using the secondary transformation matrix).

Figure 12:
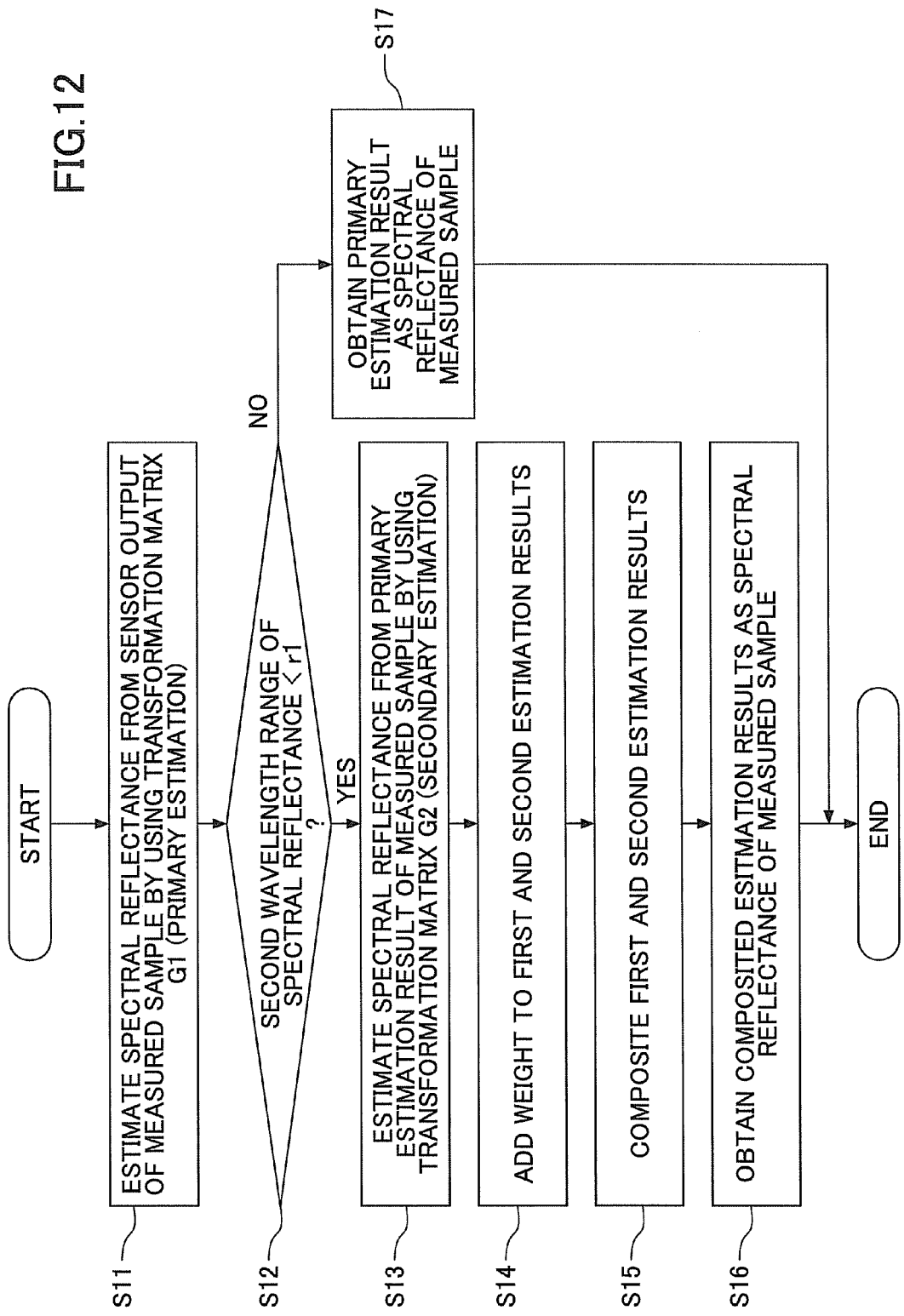
FIG. 12 is a flowchart illustrating an example of an operation of obtaining spectral characteristics with a spectral characteristic obtaining unit according to an embodiment of the present invention.

An operation of obtaining spectral characteristics with the spectral characteristic obtaining unit 109 is described with reference to FIG. 12. FIG. 12 is a flowchart illustrating an example of the operation of obtaining spectral characteristics with the spectral characteristic obtaining unit 109 according to an embodiment of the present invention.

In estimating the spectral reflectance with the spectral reflectance obtaining unit 109, first, a primary estimation of spectral reflectance is performed by using the transformation matrix G1 on the sensor output of the measurement samples (Step S11). Then, in Step S12, the spectral reflectance in a secondary wavelength band range (e.g., 400 nm-440 nm) is compared with a predetermined threshold r1 (e.g., 25%). In a case where the spectral reflectance is equal to or greater than the predetermined threshold r1 (No in Step S12), the primary estimation results are determined (obtained) as the spectral reflectance of the measurement sample (Step S17), and the operation of obtaining spectral characteristics is terminated. Therefore, in a case where it is determined that primary estimation result can be obtained with a sufficient precision (No in Step S12), the primary estimation results may be assumed to be the spectral reflectance of the measurement sample.

In a case where the spectral reflectance is less than the predetermined threshold r1 (Yes in Step S12), a secondary estimation of spectral reflectance is performed by using the transformation matrix G2 on the primary estimation results of the measurement sample (Step S13). Then, in this example, weight is added to the primary and secondary estimation results (Step S14). Alternatively, either one of the primary and secondary estimation results may be weighted.

Then, the primary and secondary estimation results are composited (Step S15). Then, the composited estimation results are determined (obtained) as the spectral reflectance of the measurement sample (Step S16).

Hence, with the spectral characteristic obtaining apparatus 1 according to the above-described embodiment of the present invention, the spectral reflectance of the measurement target 10 can be obtained with high precision and at high speed by compositing the primary and secondary estimation results using transformation matrices G1, G2. In addition, the obtaining of spectral reflectance of the measurement target 10 can be performed at low cost because the spectral characteristic obtaining apparatus 1 according to the above-described embodiment of the present invention does not require, for example, a special light source or a special sensor.

Second Embodiment

A spectral characteristic obtaining apparatus 2 according to the second embodiment of the present invention has multiple transformation matrices prepared for performing the secondary estimation of spectral reflectance. Thus, by selecting a transformation matrix from the multiple transformation matrices based on the primary estimation results, spectral reflectance of the measurement target 10 can be performed with greater precision compared to using a single transformation matrix for performing the secondary estimation.

The spectral characteristic obtaining apparatus 2 of the second embodiment has substantially the same configuration as the configuration of the spectral characteristic obtaining unit 1 including the spectral device (spectroscope) 100 and the operation unit 107 of the first embodiment. That is, the spectral characteristic obtaining apparatus 2 has: the spectral device 100 including the linear illumination source (illumination unit) 101, the first imaging optical system 102, the aperture array (area dividing unit) 103, the second imaging optical system 104, the diffraction unit (spectral diffraction unit) 105, and the linear sensor (detection unit) 106; and the operation unit 107 including the transformation matrix calculating unit 108 and the spectral characteristic obtaining unit 109. Thus, in the second embodiment, like components are denoted with like reference numerals as those of the first embodiment and are not described in further detail.

Figure 13:
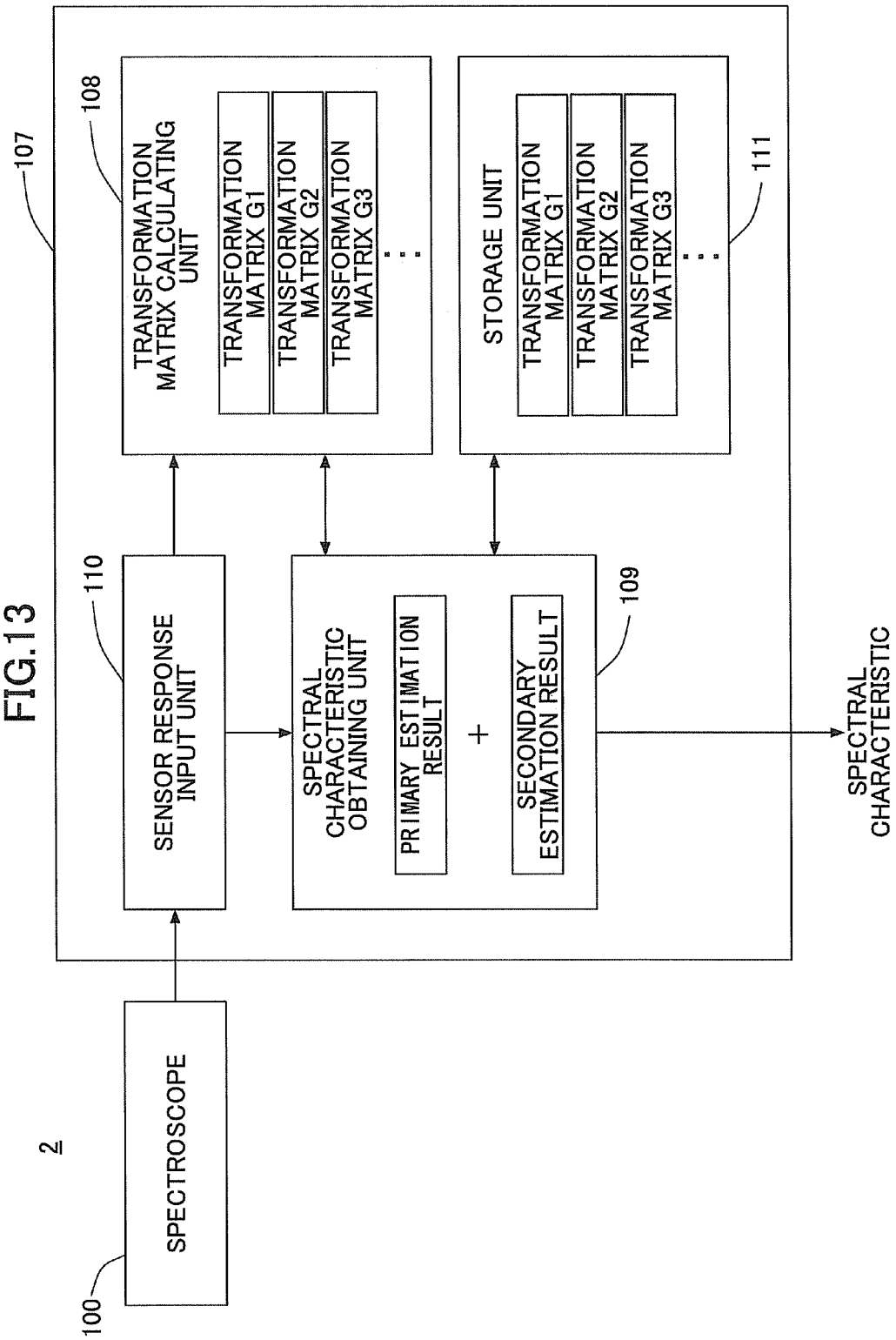
FIG. 13 is a functional block diagram for describing a function of each part of a spectral characteristic obtaining apparatus according to a second embodiment of the present invention.
Figure 14:
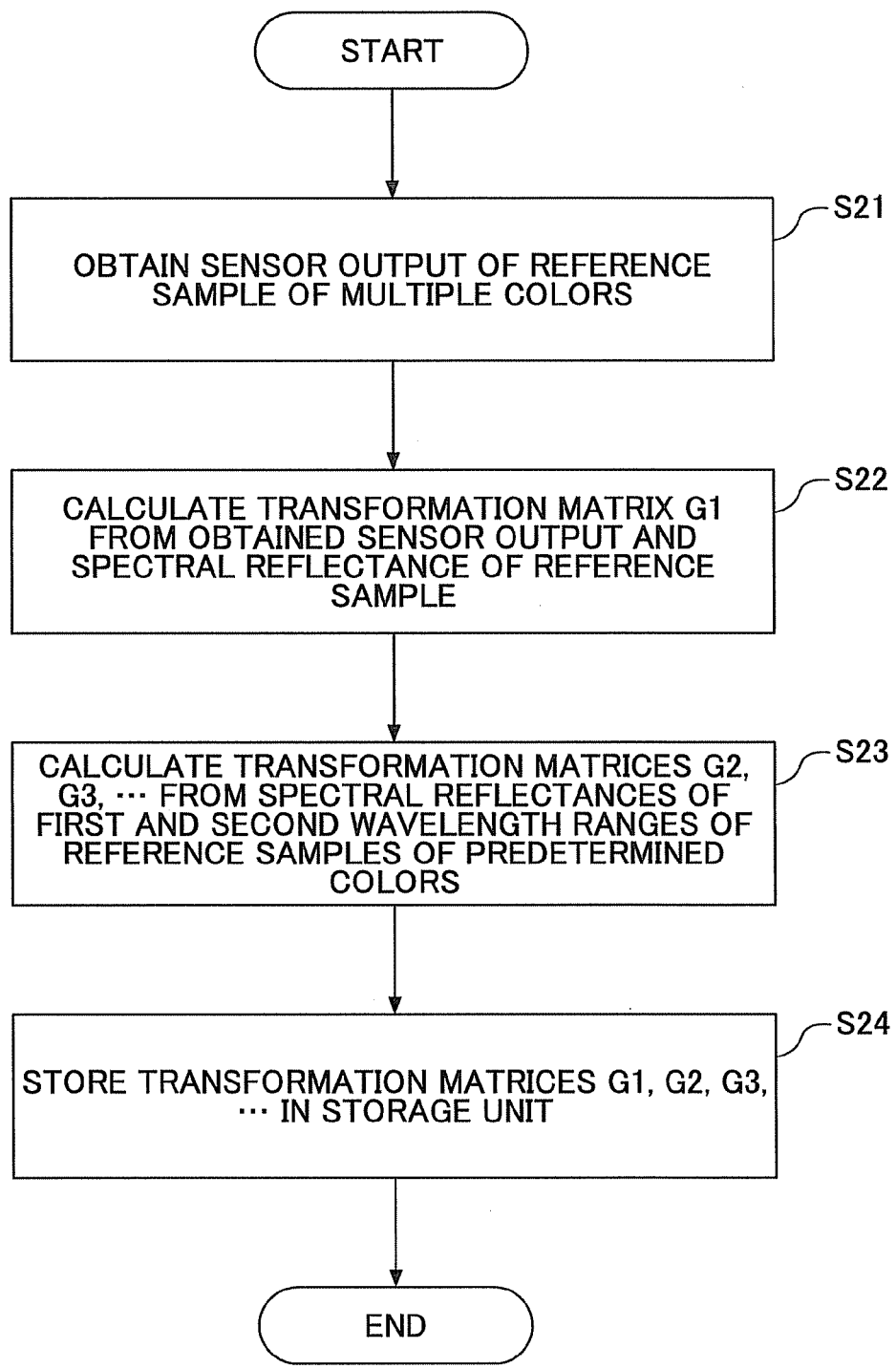
FIG. 14 is a flowchart illustrating an example of a transformation matrix calculating operation according to the second embodiment of the present invention.

FIG. 13 is a functional block diagram for describing the function of each part of the spectral characteristic obtaining apparatus 2 according to the second embodiment of the present invention. Next, an example of a transformation matrix calculating operation is described with reference to FIG. 14. FIG. 14 is a flowchart illustrating the example of the transformation matrix calculating operation according to the second embodiment of the present invention.

First, sensor outputs of the reference samples of multiple colors are obtained from the linear sensor 106 of the spectral device 100 (Step S21). A transformation matrix G1 is calculated from the sensor outputs obtained in Step S21 and the pre-obtained spectral reflectance of the reference samples (Step S22).

For example, there may be used reference samples of 125 colors formed by combining 25%, 50%, 75%, and 100% of the color components of cyan (C), magenta (M), and yellow (Y). The spectral reflectance of the reference samples is measured beforehand (i.e., pre-obtained) by using a high precision spectral device and stored in the storage unit 111.

Next, in Step S22, a matrix R1 indicated by the [Equation 2] and a matrix V1 indicated by the [Equation 3] are generated from the pre-obtained spectral reflectance of the reference samples, and a transformation matrix (primary transformation matrix G1) is calculated based on the [Equation 5].

Further, in Step S23, a transformation matrix G2 is calculated from the spectral reflectance of the reference sample of predetermined colors.

For example, a matrix R2 indicated by the [Equation 2] is generated from the spectral reflectance of reference samples having a Y concentration of 75% and 100% and a wavelength ranging in 400 nm-440 nm (secondary wavelength band), and a matrix V2 indicated by the [Equation 3] is generated from the spectral reflectance of reference samples having a Y concentration of 75% and 100% and a wavelength of 450 nm, 550 nm, and 650 (primary wavelength band). Then, a transformation matrix G2 is calculated based on [Equation 5].

Further, a matrix R3 indicated by the [Equation 2] is generated from the spectral reflectance of reference samples having a Y concentration of 50% and 75% and a wavelength ranging in 400 nm-440 nm (secondary wavelength band), and a matrix V3 indicated by the [Equation 3] is generated from the spectral reflectance of reference samples having a Y concentration of 50% and 75% and a wavelength of 450 nm, 550 nm, and 650 (primary wavelength band). Then, a transformation matrix G3 is calculated based on [Equation 5].

Finally, in Step S24, the calculated transformation matrices G1, G2, and G3 are stored in the storage unit 111.

Figure 15:
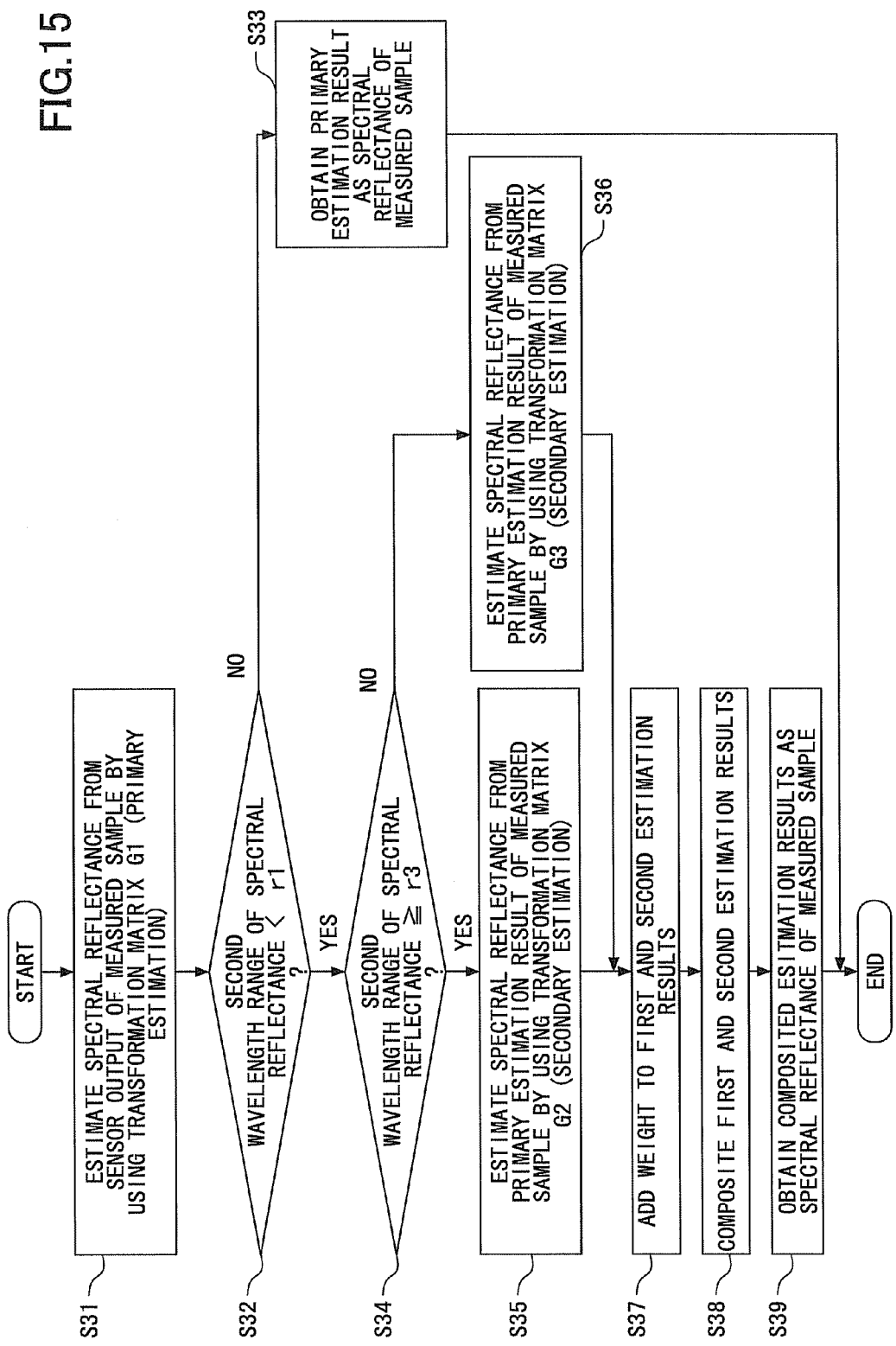
FIG. 15 is a flowchart illustrating an example of an operation of estimating spectral reflectance of a measurement target by a spectral characteristic obtaining unit according to an embodiment of the present invention.

Then, the spectral characteristic obtaining unit 112 performs spectral reflectance estimation on the measurement target by using the transformation matrices G1, G2, and G3 stored in the storage unit 111. Next, an operation of estimating the spectral reflectance of the measurement target by the spectral characteristic obtaining unit 112 is described with reference to FIG. 15. FIG. 15 is a flowchart illustrating an example of the operation of estimating the spectral reflectance of the measurement target by the spectral characteristic obtaining unit 112.

First, a primary estimation of spectral reflectance is performed with [Equation 1] based on the sensor output (light quantity) detected from the measurement sample and the transformation matrix G1 (Step S31).

Then, in Step S32, the spectral reflectance in a secondary wavelength band (450 nm) of the primary estimation (primary estimation results) is compared with a predetermined threshold r2 (e.g., 25%). In a case where the spectral reflectance is equal to or greater than the predetermined threshold r2 (No in Step S32), the primary estimation results are determined (obtained) as the spectral reflectance of the measurement sample, and the operation of obtaining spectral characteristics is terminated.

Then, in Step S34, the spectral reflectance in a secondary wavelength band (450 nm) of the primary estimation (primary estimation results) is compared with a predetermined threshold r3 (e.g., 10%). In a case where the spectral reflectance is equal to or greater than the predetermined threshold r3, the transformation matrix G2 is selected as the second transformation matrix, and a secondary estimation of spectral reflectance is performed by applying the primary estimation results and the transformation matrix G2 to [Equation 1] (Step S35). In a case where the spectral reflectance is less than the predetermined threshold r3, the transformation matrix is selected as the secondary transformation matrix, and a secondary estimation of spectral reflectance is performed by applying the sensor output of the measurement sample and the transformation matrix G3 to [Equation 1] (Step S36).

Then, one of or both of the primary and secondary estimation results are weighted (Step S37). Then, the primary and secondary estimation results are composited (Step S38). Finally, the composited estimation results are determined (obtained) as the spectral reflectance of the measurement sample, and the operation of obtaining spectral characteristics is terminated (Step S39).

Figure 16:
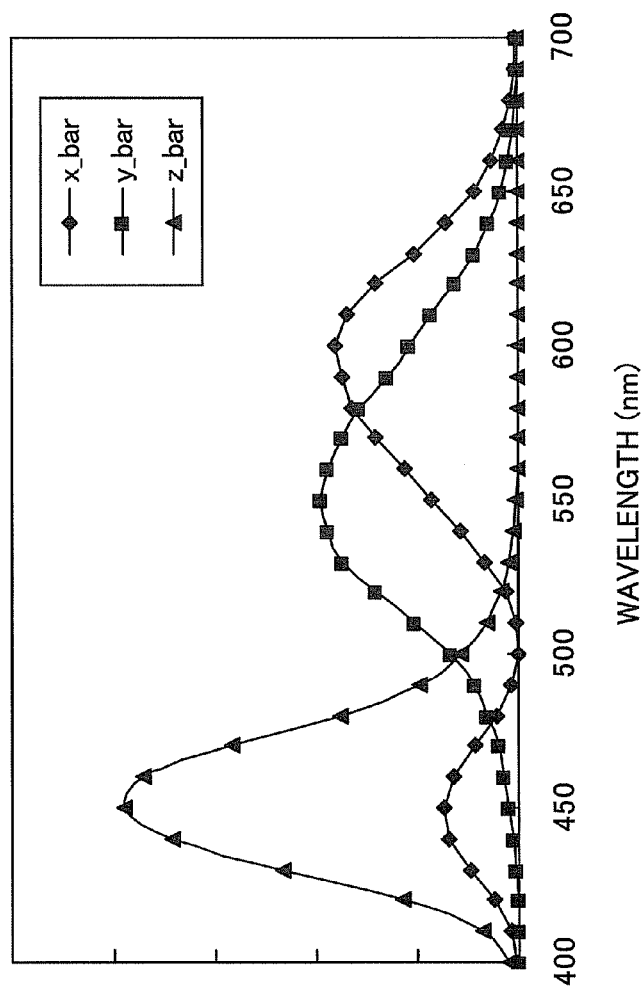
FIG. 16 is a schematic diagram illustrating an example of 3 color matching functions relative to wavelength.
Figure 17:
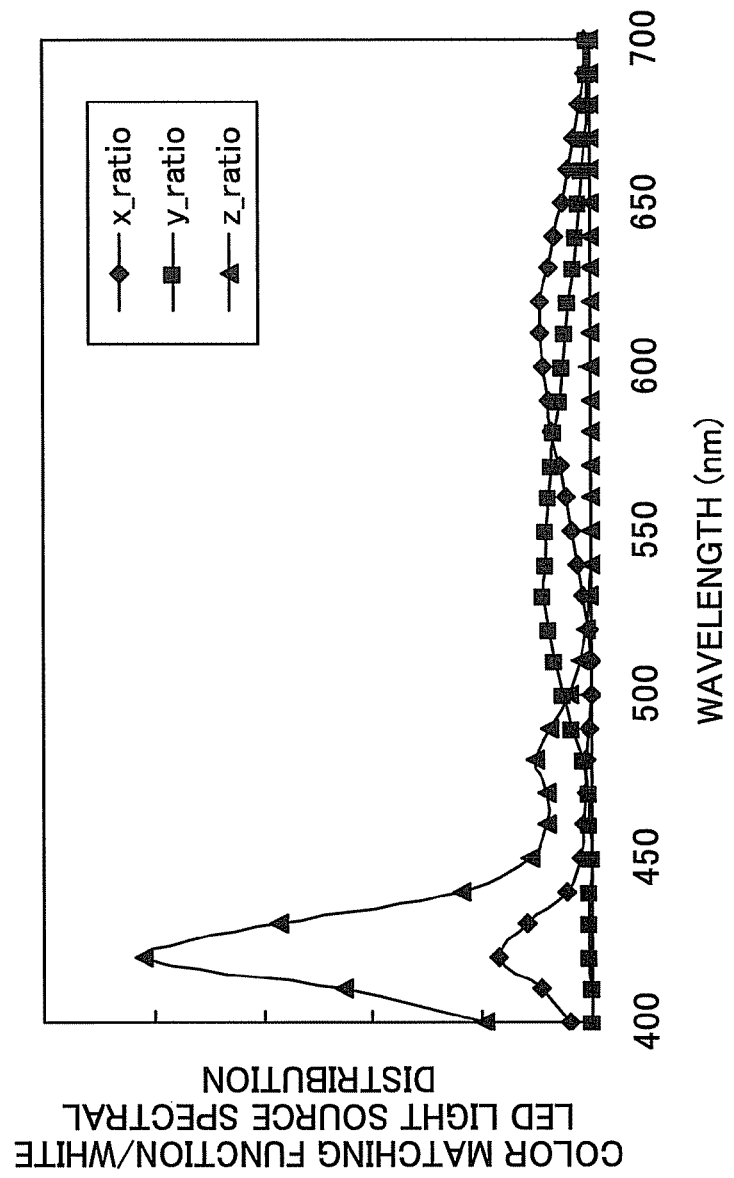
FIG. 17 is a schematic diagram illustrating a ratio between color matching functions and spectral distribution of a white LED light source relative to wavelength.

FIG. 16 is a schematic diagram illustrating an example of 3 color matching functions relative to wavelength. FIG. 17 is a schematic diagram illustrating a ratio between color matching functions and spectral distribution of a white LED light source relative to wavelength.

As illustrated in FIG. 17, the ratio between the color matching functions and the spectral distribution of the white LED light source is large in the 400 nm-450 nm wavelength band (particularly, the weight of the color matching function z is large). In a case where a pixel (sensor) of the linear sensor 106 corresponding to the 400 nm-450 nm wavelength band has a small S/N ratio, detection error of the linear sensor 106 increases. Thereby, the precision of estimating spectral reflectance significantly decreases.

As illustrated in FIG. 22, the maximum peaks of the wavelength distribution of white LED and the spectral product is located in the vicinity of the 460 nm wavelength band, and the peak of the color matching function z is approximately 450 nm. Therefore, in a case where the spectral reflectance in a wavelength band of approximately 450 nm (indicating the maximum dynamic range) is low, the estimation precision of spectral reflectance is low. The spectral reflectance in the 400 nm-450 nm wavelength band is low and the estimation precision of spectral reflectance is low in the vicinity of the wavelength band of approximately 450 nm because the colors in these wavelength bands have a high Y component density among the color components C, M, Y.

Therefore, in this embodiment, the transformation matrix calculating unit 108 calculates transformation matrices G2, G3 by using reference samples having high Y density. Then, the spectral characteristic obtaining unit 109 performs estimation of spectral reflectance by selecting a secondary transformation matrix from the transformation matrices G2, G3 according to the values of the spectral reflectance in the vicinity of the wavelength band of approximately 450 nm. Thereby, spectral reflectance can be estimated with high precision.

Figure 18:
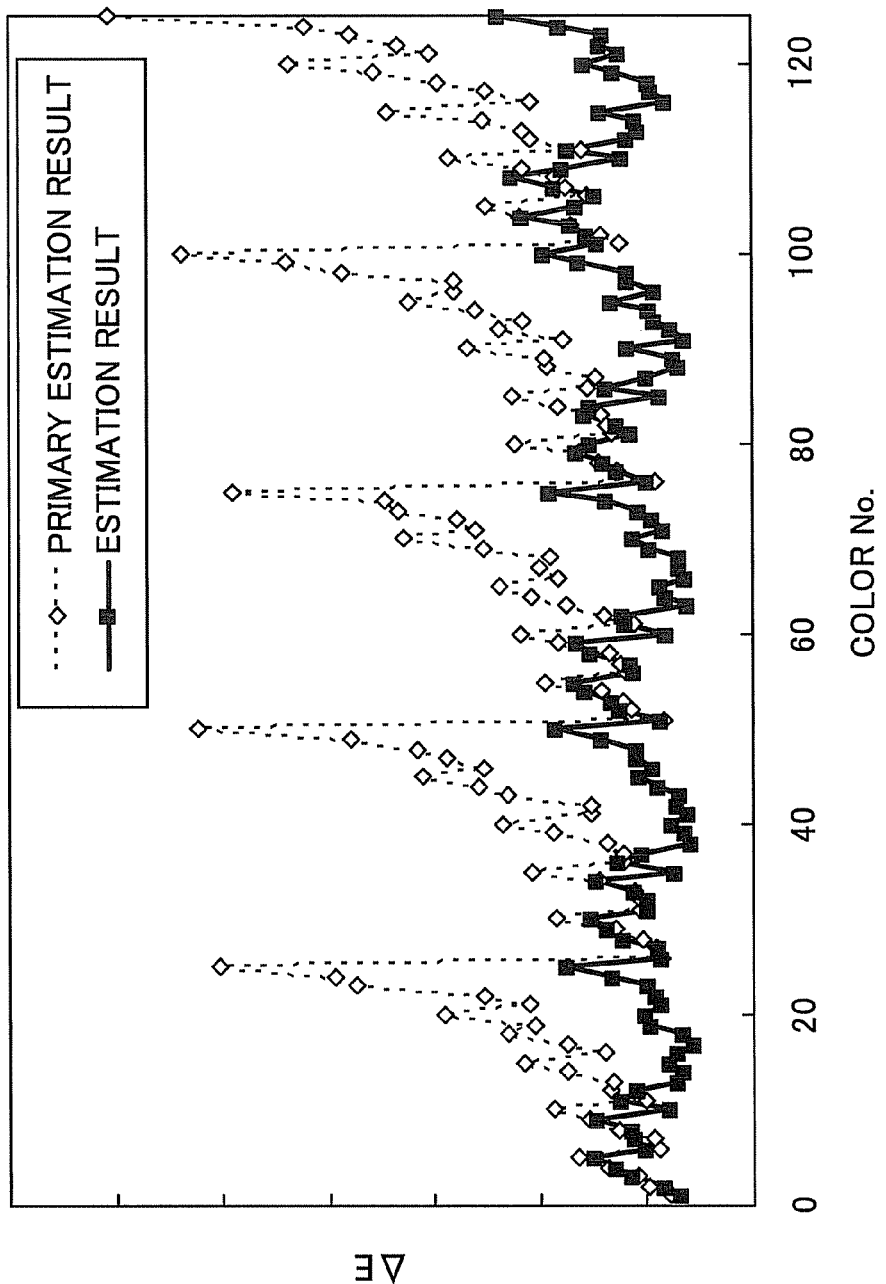
FIG. 18 is a schematic diagram illustrating the error of estimation results by a spectral characteristic obtaining unit (first example)

FIG. 18 illustrates the results in a case where the CIE L*a*b is calculated from the spectral reflectance estimated from the above-described reference samples, and the color difference ΔE with respect to colors measured beforehand. That is, FIG. 18 is a schematic diagram illustrating the primary estimation results of the spectral characteristic obtaining unit 109 and the color difference ΔE of each of the reference samples of the final estimation results obtained by performing the above-described process of selecting the secondary estimation matrix.

In the primary estimation results of FIG. 18, the colors having large color difference ΔE are colors having Y color densities of 75% to 100%. However, by compositing the primary estimation results with the secondary estimation results using the selected secondary transformation matrix, the precision of estimating spectral reflectance can be improved, and color difference ΔE can be reduced.

Therefore, with the second embodiment, spectral reflectance can be estimated with high precision by calculating (obtaining) multiple transformation matrices with the transformation matrix calculating unit 108 and using a secondary transformation matrix selected from the multiple transformation matrices according to the primary estimation results with the spectral characteristic obtaining unit 109.

It is to be noted that the threshold of the spectral reflectance of the primary estimation results is not limited to that described above. Although the transformation matrices in the short wavelength band range of 400 nm-440 nm are calculated in the above-described embodiment, transformation matrices in the long wavelength band range (e.g., 670 nm-700 nm) may also be calculated and used according to circumstance according to the primary estimation results, so that a transformation matrix selected from the transformation matrices in the long wavelength band range can also be used for estimating spectral reflectance. Further, although it is determined whether to perform the secondary estimation according to the primary estimation results, the determination may also be based on, for example, the value of a spectral product and/or the value of a sensor output. Further, thresholds for estimating spectral reflectance may be variably controlled in correspondence with, for example, printing purpose or measurement purpose.

<Example of Calculating Transformation Matrix>

Although the transformation matrix calculating unit 108 calculates two transformation matrices G2, G3 as the secondary transformation matrices to be used, more than two transformation matrices may be calculated to be used as the secondary transformation matrix.

For example, reference samples of colors indicated below may be used for calculating (obtaining) transformation matrices G2-G to be used as the secondary transformation matrix.
G2: reference samples in which Y=75%, 100%
G3: reference samples in which Y=25% (M=75%-100%), 50% (M=50%-100%), 75%
G4: reference samples in which Y=0% (M=75%-100%), 25% (M=50%-100%), 50% (M=0%-75%)
G5: reference samples in which Y=0% (M=25%-75%), 25% (M=0%-50%)
G6: reference samples in which Y=0% (M=0%-25%)

Accordingly, transformation matrices G2-G6 are calculated from the spectral reflectance of the above-described reference samples in the wavelength bands range 400 nm-440 nm (secondary wavelength band) and the spectral reflectance of the above-described reference samples in the wavelength bands of 450 nm, 550 nm, and 650 nm (primary wavelength band).

Accordingly, the spectral characteristic obtaining unit 109 selects a secondary transformation matrix from the transformation matrices G2-G6 calculated by the transformation matrix calculating unit 108 according to the value of the spectral reflectance of the primary estimation results and performs secondary estimation by using the selected secondary transformation matrix.

The selection of the secondary transformation matrix may be based on spectral reflectance thresholds of 5 levels. That is, the thresholds of the spectral reflectance for selecting the secondary transformation matrix may be, for example, 10%-20%, 20%-35%, 35%-55%, and 55% or more. Accordingly, the secondary estimation is performed by using the transformation matrix G2 in a case where the spectral reflectance in the 450 nm wavelength band is less than 10%; the transformation matrix G3 is used in a case where the spectral reflectance in the 450 nm wavelength band is 10%-20%; the transformation matrix G4 is used in a case where the spectral reflectance in the 450 nm wavelength band is 20%-35%; the transformation matrix G5 is used in a case where the spectral reflectance in the 450 nm wavelength band is 35%-55%; and the transformation matrix G6 is used in a case where the spectral reflectance in the 450 nm wavelength band is 55% or more.

Figure 19:
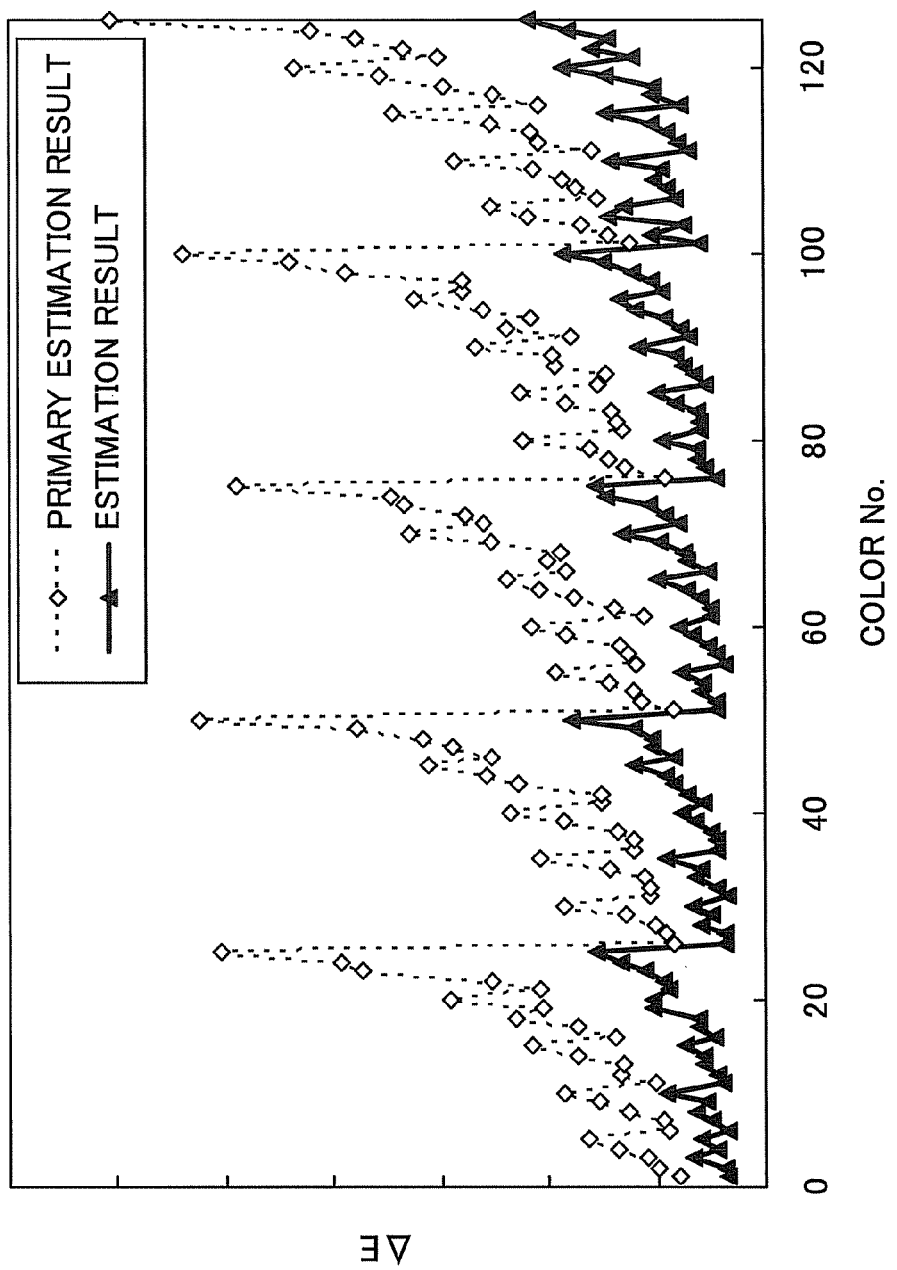
FIG. 19 is a schematic diagram illustrating the error of estimation results by a spectral characteristic obtaining unit (second example)

FIG. 19 illustrates the results and color difference ΔE in a case where the CIE L*a*b is calculated from the spectral reflectance estimated from the above-described reference samples using the above-described transformation matrices. That is, FIG. 19 is a schematic diagram illustrating the primary estimation results of the spectral characteristic obtaining unit 109 and the color difference ΔE of each of the reference samples of the final estimation results obtained by performing the above-described process of selecting the secondary estimation matrix.

Accordingly, as illustrated in FIG. 19, by performing secondary estimation using a secondary transformation matrix selected from transformation matrices G2-G6 in accordance with the primary estimation results and compositing the primary and secondary estimation results, color difference ΔE can be reduced. Thus, spectral characteristics can be estimated with high precision.

Third Embodiment

Figure 20:
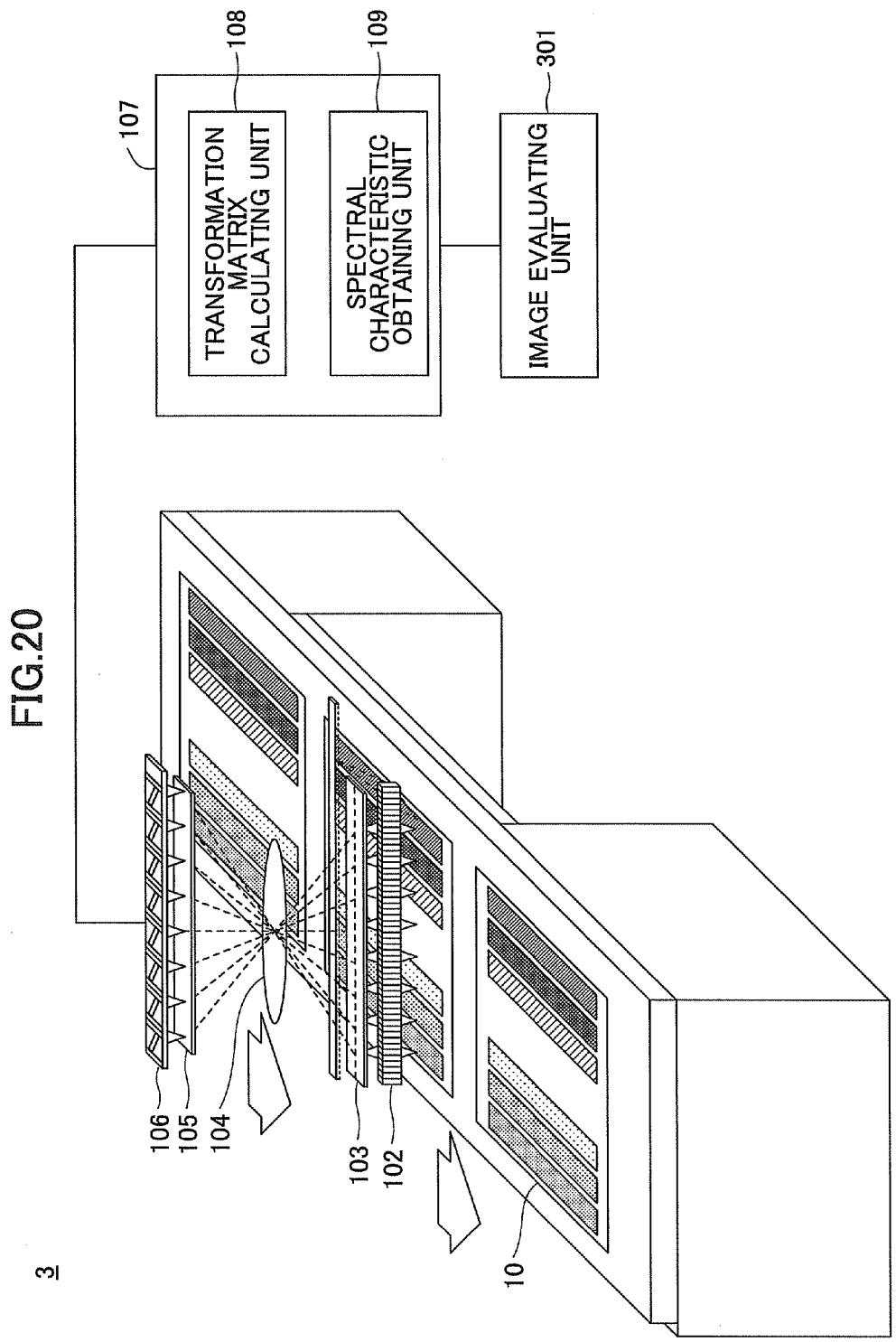
FIG. 20 is a schematic diagram illustrating an example of a configuration of an image evaluating apparatus according to a third embodiment of the present invention.

The third embodiment of the present invention is an image evaluating apparatus 3 including the spectral characteristic obtaining apparatus 1, 2 according to the first or second embodiment. FIG. 20 is a schematic diagram illustrating an example of a configuration of the image evaluating apparatus 3 according to the third embodiment.

The image evaluating apparatus 3 evaluates a measurement target (e.g., a recording medium having an image formed thereon by an electrophotographic type image forming apparatus) 10 throughout the entire width of the measurement target 10. The image evaluating apparatus includes one or more of the spectral characteristic obtaining apparatuses 1 of the first embodiment arranged in a width direction of the measurement target 10.

The image evaluating apparatus 3 includes an image evaluating unit 301 and a conveying unit (not illustrated) for conveying the measurement target 10. The image evaluating apparatus 3 is configured to move the measurement target 10 in the arrow direction illustrated in FIG. 20. Alternatively, however, the image evaluating apparatus 3 may be configured to be moved relative to the measurement target 10. The conveying unit may be, for example, a conveyor roller or a conveyor belt.

The image evaluating unit 301 calculates colorimetric data (e.g., XYZ, L*a*b*) from the spectral characteristics obtained by the spectral characteristic obtaining unit 109 and evaluates colors of an image formed on the measurement target 10. The image evaluating unit 301 can calculate spectral image data throughout the entire area on which the image of the measurement target 10 is formed by referring to, for example, pre-obtained speed data or speed data from an encoder sensor mounted to a recording medium conveying mechanism of the image evaluating apparatus 3.

It is preferable for the image evaluating unit 301 of the image evaluating apparatus 3 to compare measurement results (colorimetric results) obtained from the linear sensor 106 with a master image, extract the difference between the measurement results and the master image, and display the difference on a screen or the like. Thereby, the user of the image evaluating apparatus 3 can easily perform comparison with the master image. The master image may be an image input to the image evaluating apparatus 3 from outside the image evaluating apparatus 3. Alternatively, the master image may be based on measurement results obtained from the measurement target 10 by the image evaluating apparatus 3.

It is to be noted that the image evaluating apparatus 3 may include the spectral characteristic obtaining apparatus 2 of the second embodiment instead of including the spectral characteristic obtaining apparatus 1 of the first embodiment.

Accordingly, by including the spectral characteristic obtaining apparatus 1 or 2 in the image evaluating apparatus 3, the image evaluating apparatus 3 can evaluate the colors of an image or the like formed on a conveyed measurement target 10.

Fourth Embodiment

Figure 21:
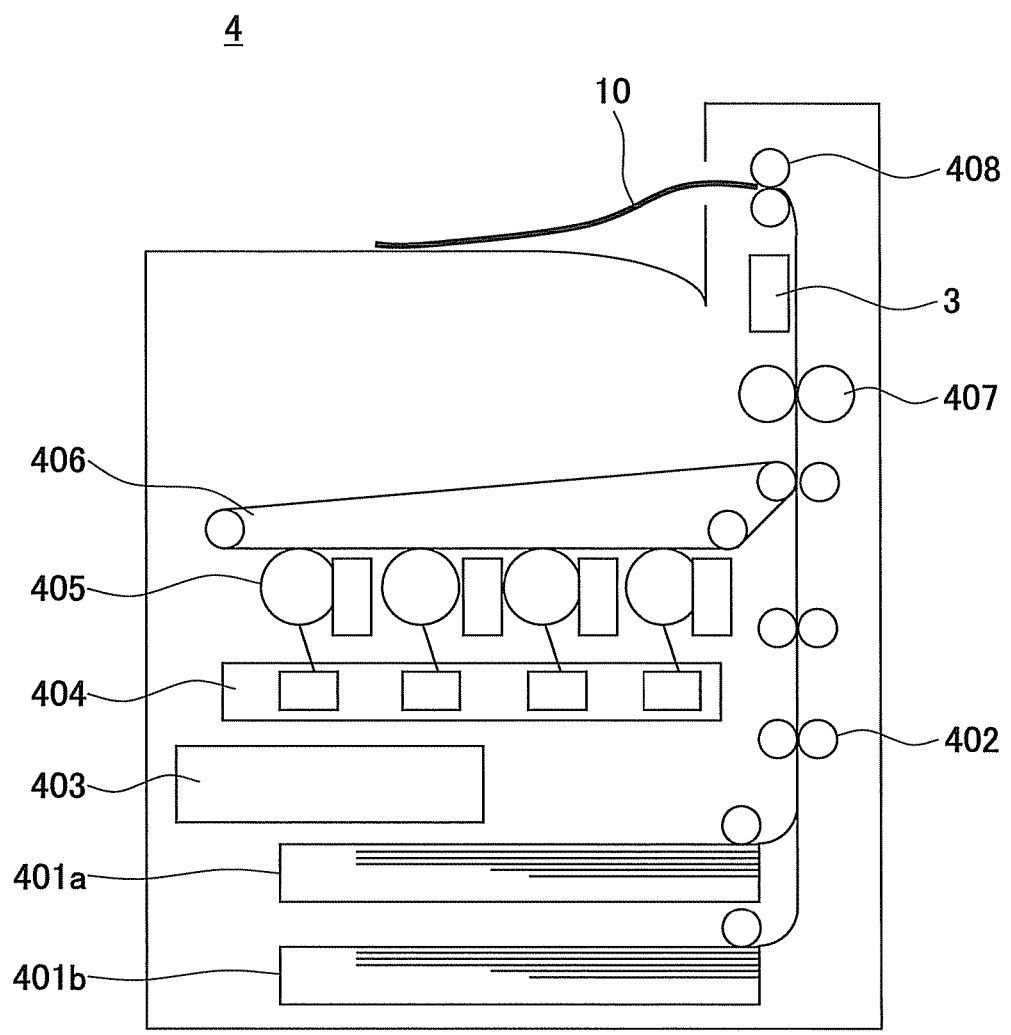
FIG. 21 is a schematic diagram illustrating an example of a configuration of an image forming apparatus according to the fourth embodiment of the present invention.

The fourth embodiment of the present invention is an image forming apparatus 4 including the image evaluating apparatus 3 of the third embodiment. FIG. 21 is a schematic diagram illustrating an example of a configuration of the image forming apparatus 4 according to the fourth embodiment.

As illustrated in FIG. 21, the image forming apparatus 4 includes, for example, the image evaluating apparatus 3 of the third embodiment, a sheet-feed cassettes 401*a*, 401*b*, a sheet-feed roller 402, a controller 403, an optical scanning system 404, a photosensitive unit 405, an intermediate transfer unit 406, a fixing roller 407, and a sheet discharge roller 408. The image forming apparatus 4 is configured to form an image on a surface of the measurement target (recording medium) 10 by way of, for example, the controller 403 along with the image evaluating apparatus 3 of the third embodiment, the sheet-feed cassettes 401*a*, 401*b*, the sheet-feed roller 402, the optical scanning system 404, the photosensitive unit 405, the intermediate transfer unit 406, the fixing roller 407, and the sheet discharge roller 408 controlled by the controller 403.

In the image forming apparatus 4, the sheet-feed roller 402 and a guide (not illustrated) conveys the measurement target 10 from the sheet-feed cassettes 401*a*, 401*b*. Along with the conveying of the measurement target 10, the optical scanning system 404 forms an electrostatic image on the photosensitive unit 405 and develops a toner image by applying toner to the electrostatic image. The toner image is, first, transferred to the intermediate transfer unit 406 (primary transfer), and then transferred to the measurement target 10 conveyed from the intermediate transfer unit 406.

Then, the transferred image is fixed to the measurement target 10 by the fixing roller 407. Then, the measurement target 10 having the image fixed thereto is discharged by the discharge roller 408. The image evaluating apparatus 3 is positioned behind the fixing roller 407 for evaluating the measurement target 10 having an image formed thereon.

The conditions of the processes of an image forming operation (e.g., developing process, transferring process, fixing process) may be adjusted by the controller 403 according to the image evaluation results of the image evaluating apparatus 3, so that high quality images can be consistently output without color change or the like.

Although the image forming apparatus 4 (including the image evaluating apparatus 3) of the fourth embodiment forms an image by using an electrophotographic method, other image forming methods (e.g., inkjet method) may be used.

Although the above-described measurement target 10 is explained as a recording medium such as paper, a recording medium other than may be used as the measurement target 1. For example, the measurement target 10 may be a plastic recording medium on which an image is formed. Thereby, the image evaluating apparatus 3 may be used to evaluate the validity or type of a banknote or a credit card.

Hence, with the above-described embodiments of the optical characteristic obtaining apparatus, spectral characteristics can be obtained with high speed and at high speed.

The present invention is not limited to the specifically disclosed embodiments, and variations and modifications may be made without departing from the scope of the present invention.

The present application is based on Japanese Priority Application No. 2012-007293 filed Jan. 17, 2012, with the Japanese Patent Office, the entire contents of which are hereby incorporated herein by reference.

What is claimed is:

1. A spectral characteristic obtaining apparatus comprising:
   a detection unit configured to detect light quantities in a plurality of wavelength bands from a measurement target;
   a storage unit configured to store pre-obtained spectral characteristics of reference samples;
   a calculation unit configured to calculate a primary transformation matrix from the light quantities and the pre-obtained spectral characteristics of at least one of the reference samples and a secondary transformation matrix from one of the pre-obtained spectral characteristics corresponding to a primary wavelength band and another one of the pre-obtained spectral characteristics corresponding to a second wavelength band; and
   an estimation unit configured to estimate the spectral characteristics of the measurement target by performing a primary estimation on the light quantities in the plural wavelength bands by using the primary transformation matrix, performing a secondary estimation on a result of the primary estimation by using the secondary transformation matrix, and compositing a result of the secondary estimation with the result of the primary estimation;
   wherein the pre-obtained spectral characteristics have larger error in the secondary wavelength band than in the primary wavelength band.

2. The spectral characteristic obtaining apparatus as claimed in claim 1, wherein the estimation unit is configured to weight at least one of the results of the primary and secondary estimations and composite the results of the primary and secondary estimations.

3. The spectral characteristic obtaining apparatus as claimed in claim 1,
   wherein the calculation unit is configured to calculate a plurality of transformation matrices from the light quantities and the pre-obtained spectral characteristics of the reference samples having different colors,
   wherein the estimation unit is configured to select one of the plural transformation matrices according to the result of the primary estimation and use the one of the plural transformation matrices as the secondary transformation matrix.

4. An image evaluating apparatus comprising:
   a spectral characteristic obtaining apparatus including
      a detection unit configured to detect light quantities in a plurality of wavelength bands from a measurement target,
      a storage unit configured to store pre-obtained spectral characteristics of reference samples,
      a calculation unit configured to calculate a primary transformation matrix from the light quantities and the pre-obtained spectral characteristics of at least one of the reference samples and a secondary transformation matrix from one of the pre-obtained spectral characteristics corresponding to a primary wavelength band and another one of the pre-obtained spectral characteristics corresponding to a secondary wavelength band, and
      an estimation unit configured to estimate the spectral characteristics of the measurement target by performing a primary estimation on the light quantities in the plural wavelength bands by using the primary transformation matrix, performing a secondary estimation on a result of the primary estimation by using the secondary transformation matrix, and compositing a result of the secondary estimation with the result of the primary estimation; and
   an evaluation unit configured to evaluate one or more colors of an image formed on the measurement target according to the spectral characteristics of the measurement target estimated by the estimation unit;
   wherein the pre-obtained spectral characteristics have larger error in the secondary wavelength band than in the primary wavelength band.

5. An image forming apparatus comprising:
   the image evaluating apparatus as claimed in claim 4; and
   a control unit configured to control an image forming process according to an evaluation result of the image evaluating apparatus.

6. A spectral characteristic obtaining method comprising the steps of:
   detecting light quantities in a plurality of wavelength bands from a measurement target;
   storing pre-obtained spectral characteristics of reference samples;
   calculating a primary transformation matrix from the light quantities and the pre-obtained spectral characteristics of at least one of the reference samples and a secondary transformation matrix from one of the pre-obtained spectral characteristics corresponding to a primary wavelength band and another one of the pre-obtained spectral characteristics corresponding to a secondary wavelength band; and
   estimating the spectral characteristics of the measurement target by performing a primary estimation on the light quantities in the plural wavelength bands by using the primary transformation matrix, performing a secondary estimation on a result of the primary estimation by using the secondary transformation matrix, and compositing a result of the secondary estimation with the result of the primary estimation;

wherein the pre-obtained spectral characteristics have larger error in the secondary wavelength band than in the primary wavelength band.

* * * * *